(12) United States Patent
Yoshida et al.

(10) Patent No.: US 8,104,271 B2
(45) Date of Patent: Jan. 31, 2012

(54) EXHAUST PURIFICATION DEVICE AND EXHAUST PURIFICATION METHOD OF INTERNAL COMBUSTION ENGINE

(75) Inventors: Kohei Yoshida, Gotenba (JP); Kotaro Hayashi, Mishima (JP); Shinya Hirota, Susono (JP); Takamitsu Asanuma, Mishima (JP); Hiromasa Nishioka, Susono (JP); Hiroshi Otsuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1035 days.

(21) Appl. No.: 11/989,867

(22) PCT Filed: Jun. 22, 2007

(86) PCT No.: PCT/JP2007/063056
§ 371 (c)(1),
(2), (4) Date: Feb. 1, 2008

(87) PCT Pub. No.: WO2008/004493
PCT Pub. Date: Jan. 10, 2008

(65) Prior Publication Data
US 2009/0255233 A1 Oct. 15, 2009

(30) Foreign Application Priority Data
Jul. 4, 2006 (JP) ................................. 2006-184616

(51) Int. Cl.
*F01N 3/00* (2006.01)
(52) U.S. Cl. ................ 60/295; 60/274; 60/276; 60/297; 60/311

(58) Field of Classification Search ................... 60/274, 60/285, 297, 301, 311, 276, 295
See application file for complete search history.

(56) References Cited

U.S. PATENT DOCUMENTS

| 5,473,890 | A | 12/1995 | Takeshima et al. | |
|---|---|---|---|---|
| 6,735,940 | B2 * | 5/2004 | Stroia et al. | 60/286 |
| 6,758,036 | B1 * | 7/2004 | Molinier | 60/286 |
| 6,837,043 | B2 * | 1/2005 | Nakatani et al. | 60/288 |
| 6,898,930 | B2 * | 5/2005 | Nakatani et al. | 60/311 |
| 7,134,274 | B2 * | 11/2006 | Asanuma | 60/295 |
| 7,181,904 | B2 | 2/2007 | Yoshida et al. | |

(Continued)

FOREIGN PATENT DOCUMENTS
EP 1 174 600 A2 1/2002
(Continued)

OTHER PUBLICATIONS

Search Report issued in European Application No. EP 07767845.6 dated Aug. 20, 2010.

*Primary Examiner* — Thomas Denion
*Assistant Examiner* — Diem Tran
(74) *Attorney, Agent, or Firm* — Oliff & Berridge, PLC

(57) ABSTRACT

An $SO_X$ trap catalyst (11) in which at least one of an alkali metal and alkali earth metal is carried diffused is arranged in an exhaust passage of an internal combustion engine. By holding the temperature of the $SO_X$ trap catalyst (11) during engine operation at the temperature where a nitrate of the at least one of the alkali metal and alkali earth metal becomes the melted state, a nitrate movement and coagulation action where the nitrate in the $SO_X$ trap catalyst (11) moves to and coagulates at the surface of the $SO_X$ trap catalyst (11) is promoted. Due to this nitrate movement and coagulation action, $SO_X$ is removed while restoring the $SO_X$ trap rate.

22 Claims, 19 Drawing Sheets

U.S. PATENT DOCUMENTS

| | | |
|---|---|---|
| 2003/0196429 A1 | 10/2003 | Nakatani et al. |
| 2004/0115104 A1 | 6/2004 | Iizuka et al. |
| 2006/0064969 A1 | 3/2006 | Yoshida et al. |

FOREIGN PATENT DOCUMENTS

| | | | |
|---|---|---|---|
| EP | | 1 659 270 A1 | 5/2006 |
| JP | | A 06-173652 | 6/1994 |
| JP | | A 06-272541 | 9/1994 |
| JP | | 2001-3782 * | 1/2001 |
| JP | | A 2001-152836 | 6/2001 |
| JP | | A 2002-038930 | 2/2002 |
| JP | | A 2005-133610 | 5/2005 |
| JP | | A 2006-116431 | 5/2006 |
| WO | WO 02/062468 A1 | | 8/2002 |

* cited by examiner

(A)

(B)

(A)

(B)

(A)

(B)

(A)

(B)

(A)

(B)

(A)

(B)

(A)

(B)

EXHAUST PURIFICATION DEVICE AND EXHAUST PURIFICATION METHOD OF INTERNAL COMBUSTION ENGINE

TECHNICAL FIELD

The present invention relates to an exhaust purification device and exhaust purification method of an internal combustion engine.

BACKGROUND ART

The fuel and lubrication oil used in the internal combustion engine contains sulfur, therefore the exhaust gas contains $SO_X$. However, this $SO_X$ acts to greatly lower the performance or durability of the exhaust gas purification catalyst or other post-treatment device arranged in an engine exhaust passage, therefore the $SO_X$ in the exhaust gas is preferably removed.

Therefore, there is known an internal combustion engine in which an $SO_X$ trap catalyst able to trap the $SO_X$ contained in the exhaust gas is arranged in an engine exhaust passage (see Japanese Patent Publication (A) No. 2005-133610). This $SO_X$ trap catalyst has the property of trapping the $SO_X$ contained in the exhaust gas when the air-fuel ratio of the exhaust gas flowing into the $SO_X$ trap catalyst is lean, allowing the trapped $SO_X$ to gradually diffuse inside the $NO_X$ trap catalyst when the temperature of the $SO_X$ trap catalyst rises when the air-fuel ratio of the exhaust gas is lean, and as a result allowing the $SO_X$ trap rate to be restored. Therefore, this internal combustion engine is provided with an estimating means for estimating the $SO_X$ trap rate by the $SO_X$ trap catalyst. When the $SO_X$ trap rate falls below a predetermined rate, the temperature of the $SO_X$ trap catalyst is raised under a lean air-fuel ratio of the exhaust gas to thereby restore the $SO_X$ trap rate.

However, the inventors engaged in repeated research on this type of $SO_X$ trap catalyst. As a result, they discovered a new method enabling restoration of the $SO_X$ trap rate and learned that if using this method, it is possible to restore the $SO_X$ trap rate even better.

DISCLOSURE OF THE INVENTION

An object of the present invention is to provide an exhaust purification device and exhaust purification method of an internal combustion engine designed to use this new method so as to restore the $SO_X$ trap rate well.

According to the present invention, there is provided an exhaust purification device of an internal combustion engine arranging an $SO_X$ trap catalyst able to trap $SO_X$ contained in exhaust gas inside an engine exhaust passage, wherein the $SO_X$ trap catalyst carries at least one of an alkali metal and alkali earth metal diffused inside it, a temperature of the $SO_X$ trap catalyst is held at a temperature where a nitrate of at least one of the alkali metal and alkali earth metal becomes a melted state during engine operation, whereby a nitrate movement and coagulation action where the nitrate in the $SO_X$ trap catalyst moves to and coagulates at the $SO_X$ trap catalyst surface is promoted, and the nitrate movement and coagulation action is used to restore the $SO_X$ trap rate and remove the $SO_X$.

Further, according to the present invention, there is provided an exhaust purification method for removing $SO_X$ contained in exhaust gas by an $SO_X$ trap catalyst arranged in an engine exhaust passage, comprising carrying at least one of an alkali metal and alkali earth metal diffused in the $SO_X$ trap catalyst, holding a temperature of the $SO_X$ trap catalyst at a temperature where a nitrate of at least one of the alkali metal and alkali earth metal becomes a melted state during engine operation so as to promote a nitrate movement and coagulation action where the nitrate in the $SO_X$ trap catalyst moves to and coagulates at the $SO_X$ trap catalyst surface, and using the nitrate movement and coagulation action to restore the $SO_X$ trap rate and remove the $SO_X$.

BEST MODE FOR CARRYING OUT THE INVENTION

Figure 1:
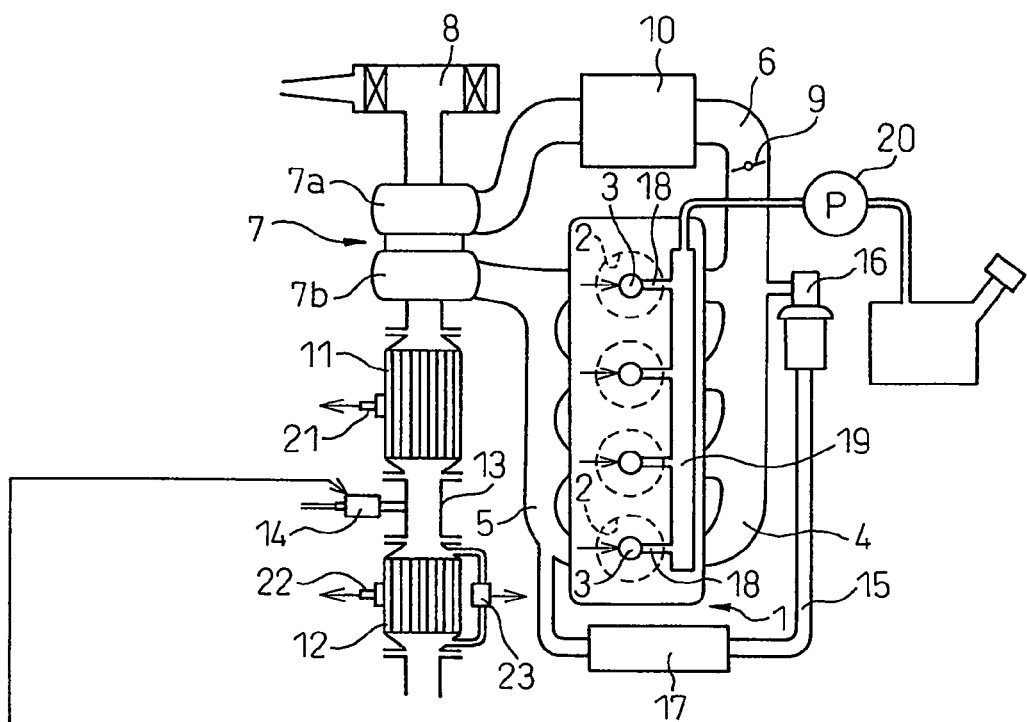
FIG. 1 is an overview of a compression ignition type internal combustion engine.
Figure 1:
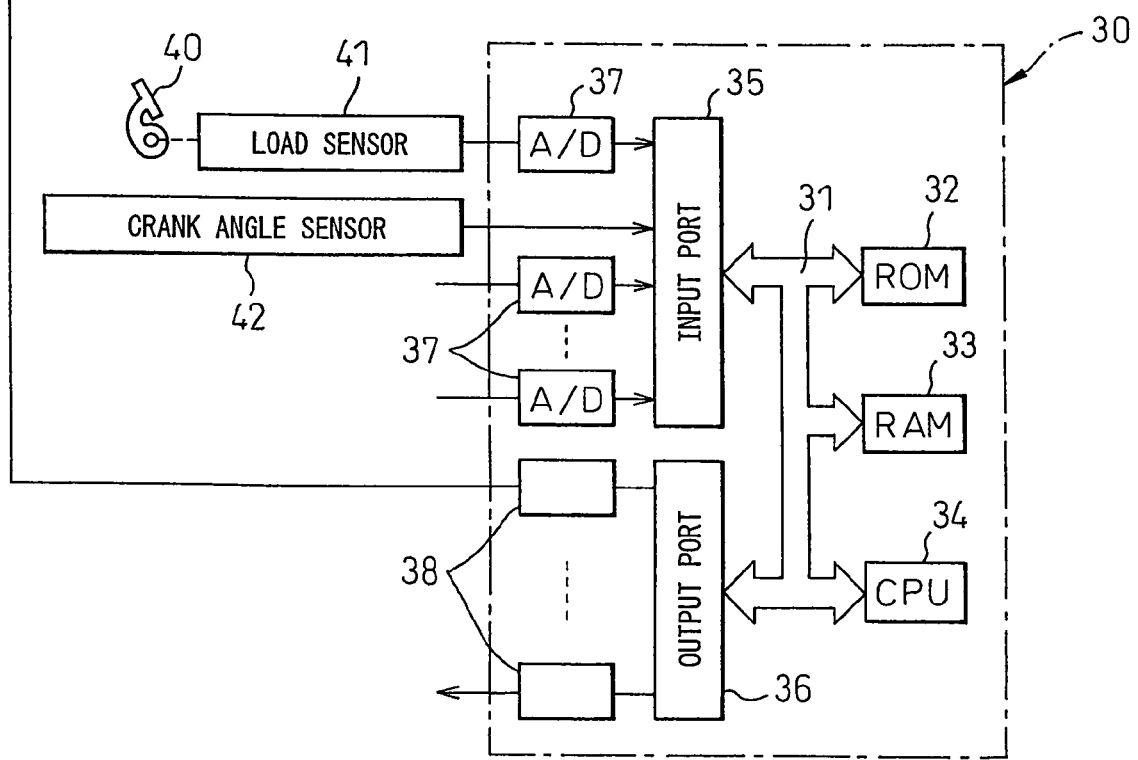

FIG. 1 shows an overview of a compression ignition type internal combustion engine.

Referring to FIG. 1, 1 shows an engine body, 2 a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected to an air cleaner 8. Inside the intake duct 6 is arranged a throttle valve 9 driven by a step motor. Further, around the intake duct 6 is arranged a cooling device 10 for cooling the intake air flowing inside the intake duct 6. In the embodiment shown in FIG. 1, the engine cooling water is guided into the cooling device 10 where the engine cooling water is used to cool the intake air. On the other hand, the exhaust manifold 5 is connected to the inlet of the exhaust turbine 7b of the exhaust turbocharger 7, while the outlet of the exhaust turbine 7b is connected to the inlet of the $SO_X$ trap catalyst 11. Further, the outlet of the $SO_X$ trap catalyst 11 is connected through an exhaust pipe 13 to a particulate filter 12. The exhaust pipe 13 has attached to it a hydrocarbon feed valve 14 for feeding for example, a hydrocarbon, for example, fuel, in the exhaust gas flowing through the inside of the exhaust pipe 13.

The exhaust manifold 5 and the intake manifold 4 are connected to each other through an exhaust gas recirculation (hereinafter referred to as the "EGR") passage 15. Inside the EGR passage 15 is arranged an electronic control type EGR control valve 16. Further, around the EGR passage 15 is arranged a cooling device 17 for cooling the EGR gas flowing through the inside of the EGR passage 15. In the embodiment shown in FIG. 1, the engine cooling water is guided inside the cooling device 17 where the engine cooling water is used to cool the EGR gas. On the other hand, each fuel injector 3 is connected through a fuel feed pipe 18 to a common rail 19. This common rail 19 is supplied inside it with fuel from an electronic control type variable discharge fuel pump 20. The fuel supplied to the inside of the common rail 19 is supplied through the fuel feed pipes 18 to the fuel injectors 3.

An electronic control unit 30 is comprised of a digital computer which is provided with components connected with each other by a bi-directional bus 31 such as a ROM (read only memory) 32, RAM (random access memory) 33, CPU (microprocessor) 34, input port 35, and output port 36. The $SO_X$ trap catalyst 11 has a temperature sensor 21 attached to it so as to detect the temperature of the $SO_X$ trap catalyst 11, while the particulate filter 12 has a temperature sensor 22 attached to it so as to detect the temperature of the particulate filter 12. The output signals of these temperature sensors 21 and 22 are input through the corresponding AD converters 37 to the input port 35. Further, the particulate filter 12 has a pressure difference sensor 23 attached to it for detecting the pressure difference before and after the particulate filter 12. The output signal of this pressure difference sensor 23 is input through the corresponding AD converter 37 to the input port 35.

An accelerator pedal 40 is connected to a load sensor 41 generating an output voltage proportional to the depression amount L of the accelerator pedal 40. The output voltage of the load sensor 41 is input through the corresponding AD converter 37 to the input port 35. Further, the input port 35 has a crank angle sensor 42 generating an output pulse every time the crankshaft rotates by for example 15° connected to it. On the other hand, the output port 36 has the fuel injectors 3, throttle valve 9 drive step motor, hydrocarbon feed valve 14, EGR control valve 16, and fuel pump 20 connected to it through corresponding drive circuits 38.

Figure 2:
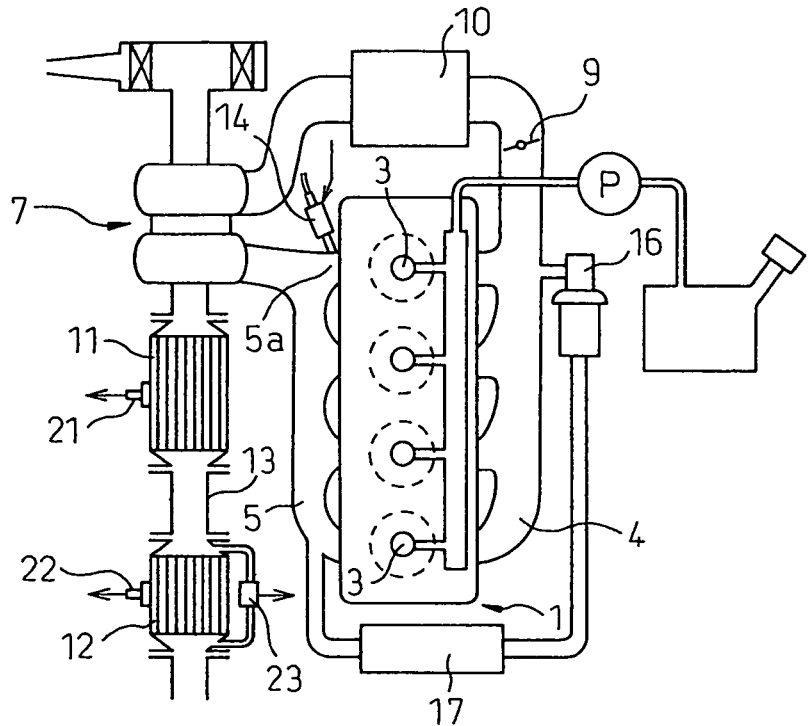
FIG. 2 is an overview of another embodiment of a compression ignition type internal combustion engine.

FIG. 2 shows another embodiment of a compression ignition type internal combustion engine. In this embodiment, the hydrocarbon feed valve 14 is provided inside the manifold tube 5a of for example the #1 cylinder of the exhaust manifold 5.

Figure 3:
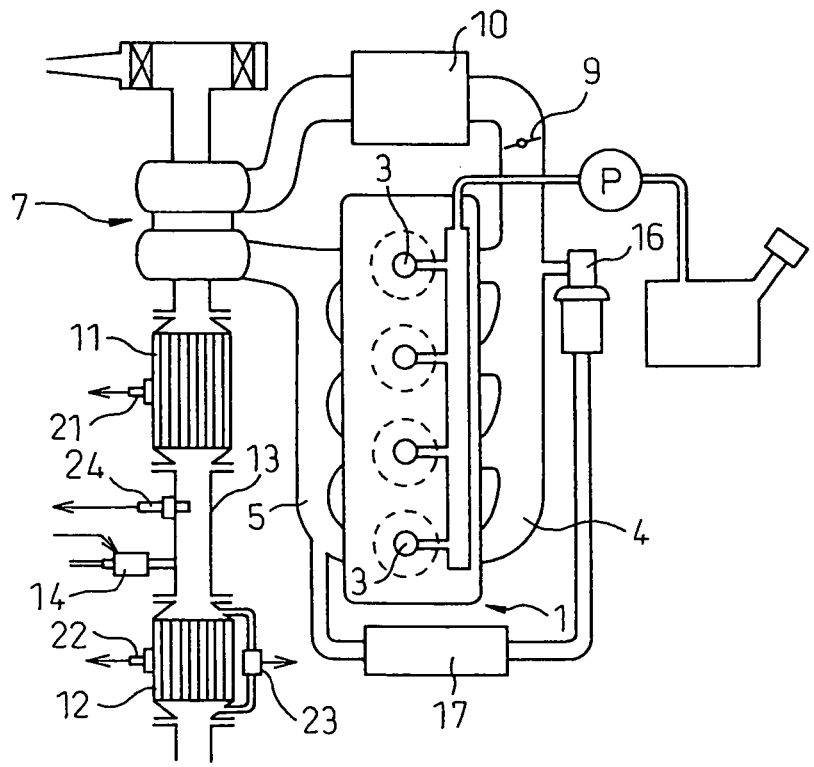
FIG. 3 is an overview showing still another embodiment of a compression ignition type internal combustion engine.

FIG. 3 shows still another embodiment of a compression ignition type internal combustion engine. In this embodiment, the exhaust pipe 13 has an $SO_X$ sensor 24 arranged in it so as to detect the $SO_X$ concentration in the exhaust gas flowing out from the $SO_X$ trap catalyst 11.

Figure 4:
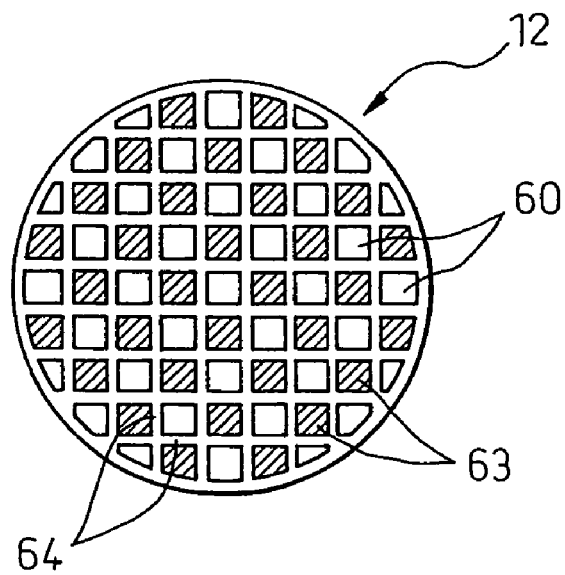
FIG. 4 is a view showing the structure of a particulate filter.
Figure 4:
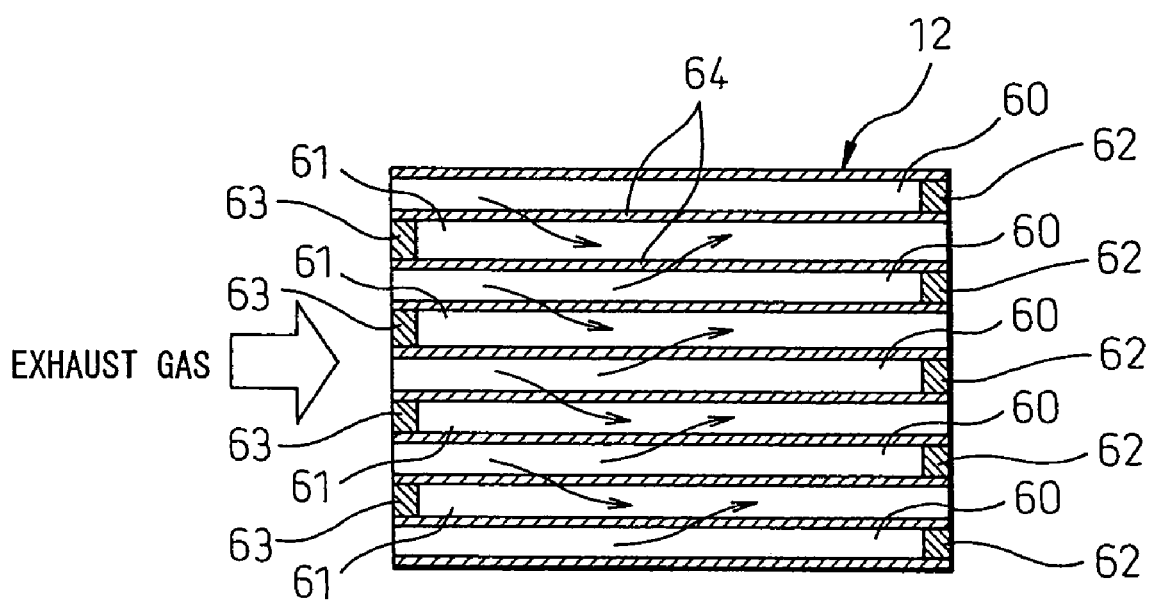

Next, the structure of the particulate filter 12 will be explained while referring to FIGS. 4(A) and (B). FIG. 4(A) shows a front view of the particulate filter 12, while FIG. 4(B) shows a side cross-sectional view of the particulate filter 12. As shown in FIGS. 4(A) and (B), the particulate filter 12 forms a honeycomb structure and is provided with a plurality of exhaust flow passages 60, 61 extending in parallel with each other. These exhaust flow passages are comprised of exhaust gas inflow passages 60 with downstream ends closed by plugs 62 and exhaust gas outflow passages 61 with upstream ends closed by plugs 63. Note that the hatched parts in FIG. 4(A) show the plugs 63. Therefore, the exhaust gas inflow passages 60 and exhaust gas outflow passages 61 are alternately arranged via thin partition walls 64. In other words, the exhaust gas inflow passages 60 and exhaust gas outflow passages 61 are arranged so that each exhaust gas inflow passage 60 is surrounded by four exhaust gas outflow passages 61 and each exhaust gas outflow passage 61 is surrounded by four exhaust gas inflow passages 60.

The particulate filter 12 is for example formed from a porous material such as cordierite. Therefore, the exhaust gas flowing into the exhaust gas inflow passage 60, as shown by the arrows in FIG. 4(B), passes through the surrounding partition walls 64 and flows out into the adjoining exhaust gas outflow passages 61. At this time, the particulate contained in the exhaust gas is trapped on the partition walls 64. The trapped part of the particulate is burned by oxidation on the partition walls 64, while the remaining particulate is deposited on the partition walls 64.

The particulate deposited on the partition wall 64 is sometimes burned off by raising the temperature of the particulate filter 12, whereby the particulate filter 12 is regenerated. In one embodiment according to the present invention, the particulate filter 12 carries an oxidation promotion catalyst on it so as to easily burn off the particulate deposited at the time of regeneration of the particulate filter 12.

Further, in another embodiment according to the present invention, the particulate filter 12 carries an $NO_X$ storage catalyst so as to treat the $NO_X$ contained in the exhaust gas flowing into the particulate filter 12. Next, the case of carrying the $NO_X$ storage catalyst on the particulate filter 12 will be explained.

Figure 5:
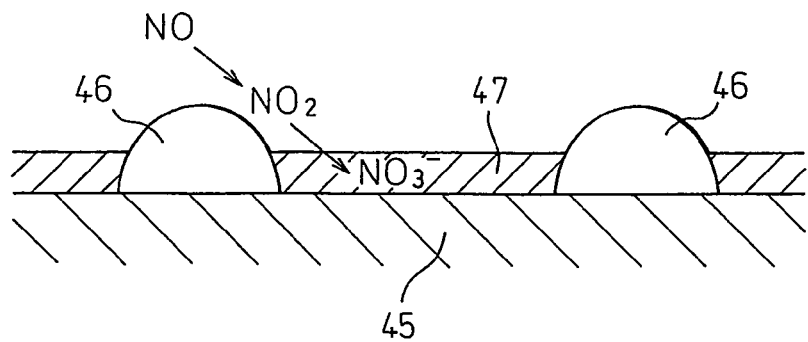
FIG. 5 is a cross-sectional view of a surface part of a catalyst carrier of an $NO_X$ storage catalyst.

When carrying the $NO_X$ storage catalyst on the particulate filter 12, the peripheral walls of the exhaust gas inflow passages 60 and exhaust gas outflow passages 61, that is, the two side surfaces of the partition walls 64 and the inside walls of the fine holes in the partition walls 64, carry, for example, a catalyst carrier comprised of alumina. FIG. 5 schematically shows a cross-section of the surface part of this catalyst carrier 45. As shown in FIG. 5, on the surface of the catalyst carrier 45, a precious metal catalyst 46 is carried diffused in it. Further, on the surface of the catalyst carrier 45, a layer of an $NO_X$ absorbent 47 is formed. In the example shown in FIG. 5, the $NO_X$ storage catalyst is formed from the catalyst carrier 45, precious metal catalyst 46, and $NO_X$ absorbent 47.

Further, in the example shown in FIG. 5, as the precious metal catalyst 46, platinum Pt is used. As the ingredient forming the $NO_X$ absorbent 47, for example, at least one ingredient selected from potassium K, sodium Na, cesium Cs, or another such alkali metal, barium Ba, calcium Ca, or another such alkali earth, and lanthanum La, yttrium Y, or another such rare earth is used.

If the ratio of the air and fuel (hydrocarbons) supplied inside the engine intake passage, combustion chambers 2, and exhaust passage upstream of the particulate filter 12 is referred to as the "air-fuel ratio of the exhaust gas", the $NO_X$ absorbent 47 absorbs the $NO_X$ when the air-fuel ratio of the exhaust gas is lean and releases the absorbed $NO_X$ when the oxygen concentration in the exhaust gas falls in an "$NO_X$ absorption/release action".

That is, explaining the case of using barium Ba as the ingredient forming the $NO_X$ absorbent 47 as an example, when the air-fuel ratio of the exhaust gas is lean, that is, when the oxygen concentration in the exhaust gas is high, the NO contained in the exhaust gas, as shown in FIG. 5, is oxidized on the platinum Pt 46 and becomes $NO_2$, next this is absorbed in the $NO_X$ absorbent 47 and, while bonding with the barium oxide BaO, diffuses in the form of nitric acid ions $NO_3^-$ inside the $NO_X$ absorbent 47. In this way, the $NO_X$ is absorbed inside the $NO_X$ absorbent 47. So long as the oxygen concentration in the exhaust gas is high, $NO_2$ is produced on the surface of the platinum Pt 46. So long as the $NO_X$ absorption ability of the $NO_X$ absorbent 47 is not saturated, the $NO_2$ is absorbed in the $NO_X$ absorbent 47 and nitric acid ions $NO_3^-$ are produced.

As opposed to this, if supplying hydrocarbons from the hydrocarbon feed valve 14 so as to make the air-fuel ratio of the exhaust gas rich or the stoichiometric air-fuel ratio, the oxygen concentration in the exhaust gas falls, so the reaction proceeds in the opposite direction ($NO_3^- \rightarrow NO_2$) and therefore the nitric acid ions $NO_3^-$ in the $NO_X$ absorbent 47 are released in the form of $NO_2$ from the $NO_X$ absorbent 47. Next, the released $NO_X$ is reduced by the unburned HC and CO contained in the exhaust gas.

In this way, when the air-fuel ratio of the exhaust gas is lean, that is, when combustion is performed under a lean air-fuel ratio, the $NO_X$ in the exhaust gas is absorbed in the $NO_X$ absorbent 47. However, when combustion continues under a lean air-fuel ratio, during that time the $NO_X$ absorption ability of the $NO_X$ absorbent 47 ends up becoming saturated and therefore the $NO_X$ absorbent 47 ends up no longer being able to absorb the $NO_X$. Therefore, in the embodiment according to the present invention, before the absorption ability of the $NO_X$ absorbent 47 becomes saturated, hydrocarbons are supplied from the hydrocarbon feed valve 14 so as to temporarily make the air-fuel ratio of the exhaust gas rich and thereby make the $NO_X$ be released from the $NO_X$ absorbent 47.

However, exhaust gas contains $SO_X$, that is, $SO_2$. If this $SO_2$ flows into the $NO_X$ storage catalyst, this $SO_2$ is oxidized at the platinum Pt 46 and becomes $SO_3$. Next, this $SO_3$ is absorbed in the $NO_X$ absorbent 47 and, while bonding with the barium oxide BaO, diffuses in the $NO_X$ absorbent 47 in the form of sulfuric acid ions $SO_4^{2-}$ to produce stable sulfate $BaSO_4$. However, the $NO_X$ absorbent 47 has a strong basicity, so this sulfate $BaSO_4$ is stable and hard to break down. With just making the air-fuel ratio of the exhaust gas rich, the sulfate $BaSO_4$ will not break down and will remain as it is. Therefore, in the $NO_X$ absorbent 47, as time elapses, the sulfate $BaSO_4$ increases. Therefore, along with the elapse of time, the $NO_X$ amount which can be absorbed by the $NO_X$ absorbent 47 falls. That is, the $NO_X$ storage catalyst undergoes sulfur poisoning.

However, in this case, if making the air-fuel ratio of the exhaust gas flowing into the particulate filter 12 rich in the state of raising the temperature of the particulate filter 12, that is, the temperature of the $NO_X$ storage catalyst, to the $SO_X$ release temperature of 600° C. or more, the $NO_X$ absorbent 47 is made to release the $SO_X$. However, in this case, the $NO_X$ absorbent 47 only releases a little $SO_X$ at a time. Therefore, to make the $NO_X$ absorbent 47 release all of the absorbed $SO_X$, the air-fuel ratio must be made rich over a long time and therefore there is the problem that a large amount of hydrocarbons becomes necessary. Further, the $SO_X$ released from the $NO_X$ absorbent 47 is exhausted into the atmosphere. This is also not preferable.

Therefore, in the present invention, an $SO_X$ trap catalyst 11 is arranged upstream of the particulate filter carrying the $NO_X$ storage catalyst. This $SO_X$ trap catalyst 11 is used to trap the $SO_X$ contained in the exhaust gas and thereby prevent $SO_X$ from being sent into the $NO_X$ storage catalyst. That is, by arranging the $SO_X$ trap catalyst 11 upstream of the particulate filter 12, the $NO_X$ storage catalyst is prevented from sulfur poisoning.

Further, this sulfur poisoning occurs even in the above embodiment where an oxidation promotion catalyst is carried on a particulate filter 12 to enable the deposited particulate to be easily burned off. That is, in this case as well, if $SO_X$ flows into the particulate filter 12, the oxidation promotion catalyst suffers from sulfur poisoning and as a result the deposited particulate can no longer be easily burned off. Therefore, in this embodiment as well, by arranging an $SO_X$ trap catalyst 11 upstream of the particulate filter 12, it is possible to prevent the oxidation promotion catalyst from suffering from sulfur poisoning.

In addition, selective reduction catalysts, HC absorbents, and various other post-treatment devices causing sulfur poisoning are known. With these post-treatment devices as well, by arranging the $SO_X$ trap catalyst 11 upstream of the post-treatment devices, it is possible to prevent the post-treatment devices from suffering from sulfur poisoning.

Figure 6:
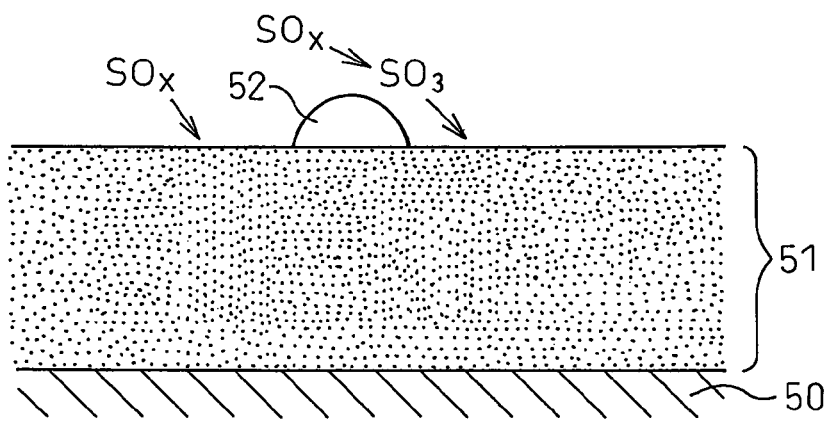
FIG. 6 is a cross-sectional view of a surface part of a base material of an $SO_X$ trap catalyst.
Figure 6:
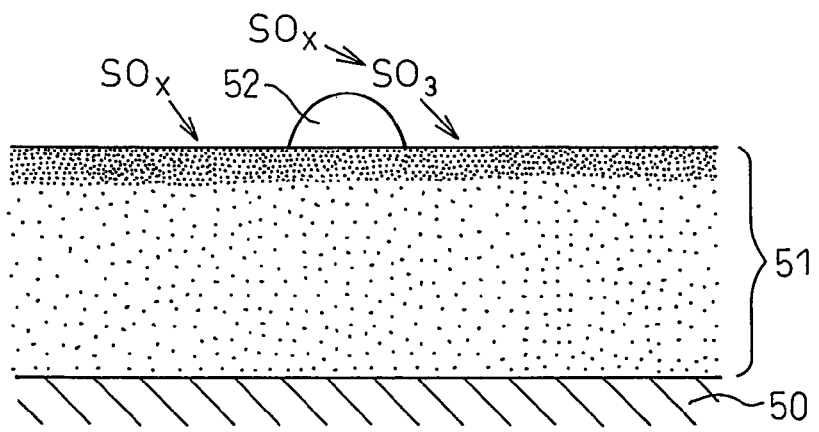

Next, this $SO_X$ trap catalyst 11 will be explained. This $SO_X$ trap catalyst 11 is comprised of for example a honeycomb structure monolithic catalyst and has a large number of exhaust gas circulation holes extending straight in the axial direction of the $SO_X$ trap catalyst 11. When forming the $SO_X$ trap catalyst 11 from a honeycomb structure monolithic catalyst in this way, the inner circumferential walls of the exhaust gas circulation holes, that is, the base materials, are formed with a coat layer comprised of an aggregate of a particulate catalyst carrier comprised of for example alumina. FIG. 6(A) schematically shows the cross-section of the coat layer 51 formed on the surface of the base material 50. As shown in FIG. 6(A), this coat layer 51 carries the precious metal catalyst 52 diffused on its surface.

In the embodiment according to the present invention, as the precious metal catalyst 52, platinum is used. Inside the coat layer 51, the catalyst carried on the catalyst carrier is uniformly diffused as shown by the dark spots. In the present invention, the catalyst uniformly diffused in the coat layer 51 is comprised of at least one of an alkali metal and alkali earth metal. In the embodiment according to the present invention, at least one element selected from in particular lithium Li, sodium Na, and potassium K among the alkali metals and in particular calcium Ca and magnesium Mg among the alkali earth metal is used.

Next, the trap mechanism of $SO_X$ in the $SO_X$ trap catalyst 11 clarified by research by the inventors will be explained. Note that below, the trap mechanism of $SO_X$ will be explained taking as an example the case of using the alkali metal potassium K, but the trap mechanism is similar for the case of use of another alkali metal and alkali earth metal as well.

FIG. 6(A) shows the $SO_X$ trap catalyst 11 at the time of a new product. At this time, potassium K is uniformly diffused in the coat layer 51. Further, at this time, the potassium K in the coat layer 51 bonds with the $CO_2$ in the atmosphere and takes the form of the carbonate $K_2CO_3$. When the engine is operated, the NO contained in a large amount in the exhaust gas is oxidized at the platinum Pt 52, then is taken into the coat layer 51 exhibiting basicity and is diffused in the form of nitric acid ions $NO_3^-$ inside the coat layer 51. The nitric acid ions $NO_3^-$ are stronger in acidity than carbonic acid ions $CO_3^-$, therefore the carbonic acid ions $CO_3^-$ bonded with the potassium K are replaced with nitric acid ions $NO_3^-$, so nitrate $KNO_3$ is formed in the coat 51.

On the other hand, when the engine is operated, the $SO_X$ contained in the exhaust gas, that is, the $SO_2$, is oxidized on the platinum Pt 52 as shown in FIG. 6(A), then is taken into the coat layer 51 exhibiting basicity in the form of sulfuric acid ions $SO_{42}$. However, the concentration of the $SO_X$ contained in the exhaust gas is considerably lower than the concentration of the $NO_X$. Therefore, around when the $SO_X$ is taken into the coat layer 51 in the form of sulfuric acid ions $SO_4^{2-}$, a large amount of the potassium K in the coat layer 51 becomes nitrate $KNO_3$. Therefore, the $SO_2$ is taken into the coat layer 51 where the nitrate $KNO_3$ is formed in the form of sulfuric acid ions $SO_4^{2-}$.

In this case, sulfuric acid ions $SO_4^{2-}$ have a stronger acidity than nitric acid ions $NO_3^-$, therefore at this time, the nitric acid ions $NO_3^-$ bonded with the potassium K are replaced with the sulfuric acid ions $SO_4^{2-}$, so sulfate $K_2SO_4$ is formed near the surface of the coat layer 51. In this way, $SO_X$ is trapped in the $SO_X$ trap catalyst 11.

Figure 7:
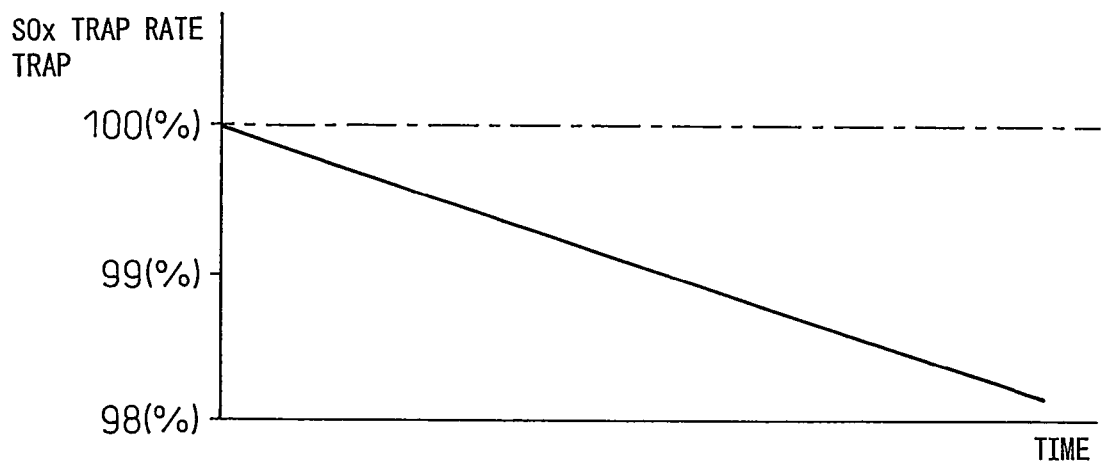
FIG. 7 is a view showing an $SO_X$ trap rate.
Figure 7:
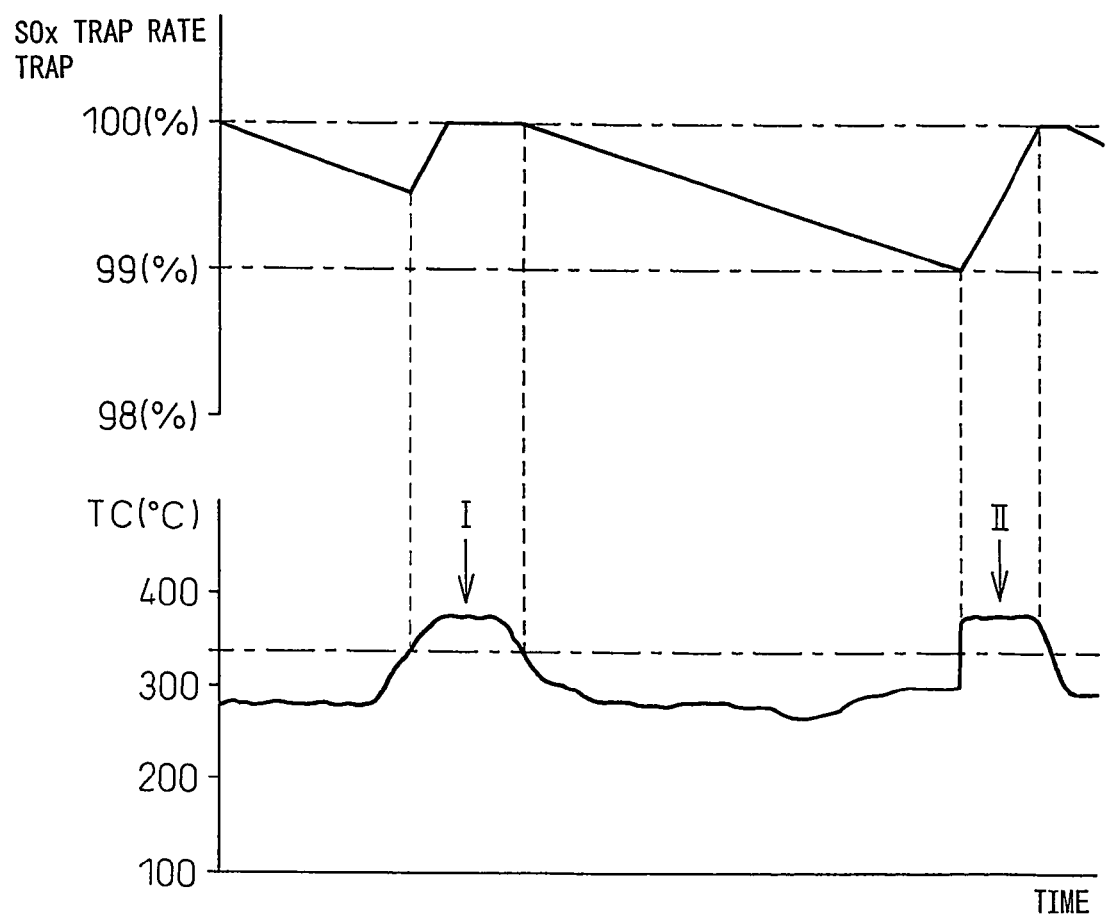

If the sulfate $K_2SO_4$ formed near the surface of the coat layer 51 increases, the nitrate $KNO_3$ able to take in the $SO_X$ near the surface of the coat layer 51 decreases and as a result the trap ability of the $SO_X$ is weakened. Here, if the ratio of the $SO_X$ trapped in the $SO_X$ trap catalyst 11 in the $SO_X$ contained in the exhaust gas is called the $SO_X$ trap rate, if the sulfate $K_2SO_4$ formed near the surface of the coat layer 51 increases, the $SO_X$ trap rate falls along with this. Therefore, as shown in FIG. 7(A), the $SO_X$ trap rate TRAP gradually falls along with the elapse of time.

Under these circumstances, the inventors engaged in repeated research and as a result discovered if holding the temperature of the $SO_X$ trap catalyst 11 at a temperature where a nitrate of at least one of the alkali metal and alkali earth metal, for example, $KNO_3$, becomes the melted state during engine operation, the nitrate $KNO_3$ in the $SO_X$ trap catalyst 11 moves to and coagulates at the surface of the $SO_X$ trap catalyst 11, that is, the surface of the coat layer 51, in a short time as shown in FIG. 6(B), whereby the $SO_X$ trap rate is restored.

That is, if $SO_X$ is taken in near the surface of the coat layer 51 in the form of sulfuric acid ions $SO_4^{2-}$, the acidity near the surface of the coat layer 51 becomes stronger. Therefore, if the nitrate $KNO_3$ is held in the melted state, the nitrate $KNO_3$ moves toward the surface of the coat layer 51 and coagulates near the surface of the coat layer 51. If the nitrate $KNO_3$ coagulates near the surface of the coat layer 51 in this way, the arriving $SO_X$ is immediately taken inside in the form of sulfuric acid ions $SO_4^{2-}$, next is trapped in the coat layer 51 in the form of sulfate $K_2SO_4$. Therefore, if holding the nitrate of at least one of the alkali metal and alkali earth metal at the melted state, the $SO_X$ trap rate can be restored to substantially 100 percent.

Note that the nitrate $KNO_3$ is believed to move somewhat toward the surface of the coat layer 51 even when not in the melted state. Therefore, accurately speaking, in the present invention, by holding the temperature of the $SO_X$ trap catalyst 11 at the temperature where the nitrate $KNO_3$ becomes the melted state during engine operation, the movement and coagulation of the nitrate $KNO_3$ in the $SO_X$ trap catalyst 11 to and at the surface of the coat layer 51, that is, the nitrate movement and coagulation action, is promoted. Due to this nitrate movement and coagulation action, the $SO_X$ trap rate is restored.

Here, the melting points of typical carbonates, nitrates, and sulfates of alkali metals used in the present invention will be shown in the following table.

| Carbonate | Melting point | Nitrate | Melting point | Sulfate | Melting point |
|---|---|---|---|---|---|
| $Li_2CO_3$ | 618° C. | $LiNO_3$ | 261° C. | $Li_2SO_4$ | 860° C. |
| $Na_2CO_3$ | 851° C. | $NaNO_3$ | 308° C. | $Na_2SO_4$ | 884° C. |
| $K_2CO_3$ | 891° C. | $KNO_3$ | 333° C. | $K_2SO_4$ | 1069° C. |

From the above table, it is learned that the melting points of nitrates of alkali metals are between about 260° C. to 340° C. or considerably lower than the melting points of carbonates and sulfates. Therefore, during engine operation, it is possible to easily hold the temperature of the $SO_X$ trap catalyst 11 at a temperature where the nitrate becomes a melted state.

On the other hand, as the catalyst diffused in the coat layer 51, calcium Ca, magnesium Mg, or another alkali earth metal can also be used. That is, the exhaust gas contains moisture, so a nitrate of an alkali earth metal becomes a hydrate. Among the hydrates of alkali earth metals, there are ones with a melting point of 100° C. or less. For example, a tetrahydrate of calcium nitrate $Ca(NO_3)_2$ has a melting point of about 43° C., while a hexahydrate of magnesium nitrate $Mg(NO_3)_2$ has a melting point of about 95° C.

In this way, among the hydrates of nitrates of alkali earth metals, there are ones with low melting points. Therefore, if using calcium Ca or magnesium Mg as the catalyst diffused in the coat layer 51, the nitrate of the alkali earth metal will move to and coagulate at the surface of the coat layer 51 even at the low temperature of 100° C. or less. Therefore, the $SO_X$ trap rate will be restored at a low temperature. Note that in the present invention, as the catalyst diffused in the coat layer 51, a mixture of an alkali metal and an alkali earth metal may be used.

FIG. 7(B) shows the changes in the $SO_X$ trap rate TRAP when using potassium K as the catalyst carried on the $SO_X$ trap catalyst 11. As shown in the above table, the melting point of potassium sulfate $KNO_3$ is 333° C., therefore as shown in FIG. 7(B), when the temperature TC of the $SO_X$ trap catalyst 11 exceeds the melting point of potassium sulfate $KNO_3$, the nitrate movement and coagulation action is promoted and the $SO_X$ trap rate TRAP is restored.

Note that to promote the nitrate movement and coagulation action, it is necessary that the coat layer 51 take in $SO_X$. For this reason, it is necessary to oxidize $SO_2$ to $SO_3$. This $SO_2$ oxidation action is performed well up to a temperature TC of the $SO_X$ trap catalyst 11 of about 500° C., but gradually becomes weaker when exceeding 500° C. Therefore, there is a temperature region of the $SO_X$ trap catalyst 11 where the nitrate movement and coagulation action is promoted. The lower limit temperature of this temperature region is the melting point of the nitrate of the at least one of an alkali metal and alkali earth metal, while the upper limit temperature of this temperature region can be said to be the upper limit temperature at which $SO_2$ can be oxidized on the $SO_2$ trap catalyst 11.

In FIG. 7(B), I shows the case where the temperature TC of the $SO_X$ trap catalyst 11 just happens to become the temperature range where the nitrate movement and coagulation action is promoted during engine operation. At this time, the $NO_X$ trap rate is restored. However, if the temperature TC of the $SO_X$ trap catalyst 11 does not become the temperature range where the nitrate movement and coagulation action is promoted during engine operation, the $SO_X$ trap rate TRAP continues to fall.

Therefore, in the embodiment according to the present invention, as shown by II in FIG. 7(B), when for example the $SO_X$ trap rate TRAP falls 1 percent during engine operation, temperature raising control of the $SO_X$ trap catalyst 11 is performed so that the temperature TC of the $SO_X$ trap catalyst 11 is held in the temperature range where the nitrate movement and coagulation action is promoted. That is, in the embodiment according to the present invention, by occasionally holding the temperature of the $SO_X$ trap catalyst 11 in the temperature region where the nitrate movement and coagulation action is promoted during engine operation, the $SO_X$ trap rate TRAP can be occasionally restored.

Therefore, the method of raising the temperature of is the $SO_X$ trap catalyst 11 will be explained while referring to FIG. 8.

One of the methods effective for raising the temperature of the $SO_X$ trap catalyst 11 is the method of delaying the fuel injection timing until compression top dead center or later. That is, normally, the main fuel $Q_m$ is injected near compression top dead center as shown by (I) in FIG. 8. In this case, as shown by (II) in FIG. 8, if the injection timing of the main fuel $Q_m$ is delayed, the afterburn period becomes longer and therefore the exhaust gas temperature rises. If the exhaust gas temperature rises, the temperature of the $SO_X$ trap catalyst 11 rises along with that.

Figure 8:
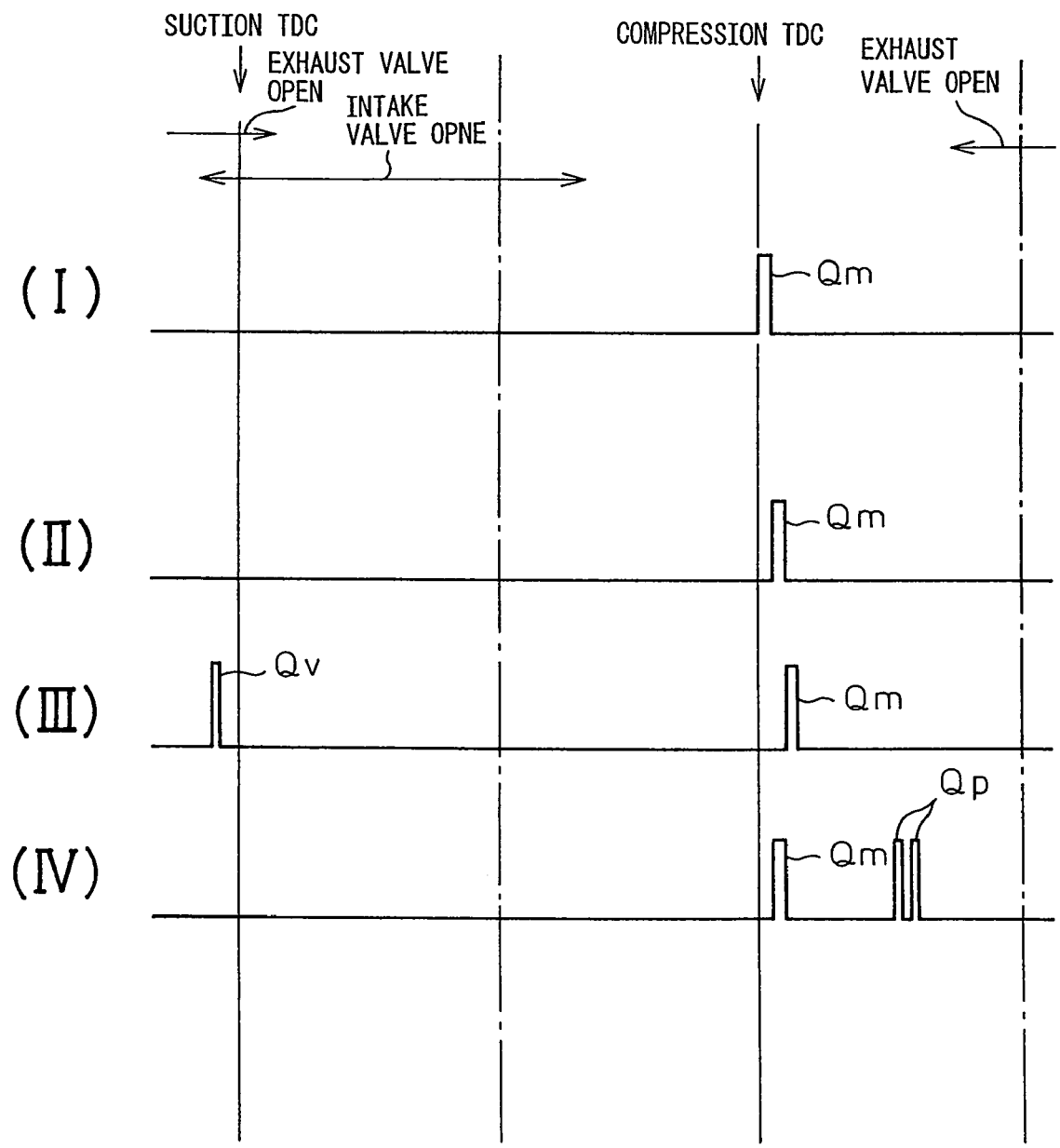
FIG. 8 is a view showing an injection timing.

Further, to raise the temperature of the $SO_X$ trap catalyst 11, as shown by (III) of FIG. 8, in addition to the main fuel $Q_m$, it is also possible to inject auxiliary fuel $Q_v$ near suction top dead center. In this way, if additionally injecting auxiliary fuel $Q_v$, the fuel which is burned increases by exactly the amount of the auxiliary fuel $Q_v$, so the exhaust gas temperature rises and therefore the temperature of the $SO_X$ trap catalyst 11 rises.

On the other hand, if injecting auxiliary fuel $Q_v$ near suction top dead center in this way, during the compression stroke, the heat of compression causes aldehydes, ketones, peroxides, carbon monoxide, or other intermediate products to be produced from this auxiliary fuel $Q_v$. These intermediate products cause the reaction of the main fuel $Q_m$ to be accelerated. Therefore, in this case, as shown in (III) of FIG. 8, even if greatly delaying the injection timing of the main fuel $Q_m$, good combustion is obtained without causing misfires. That is, the injection timing of the main fuel $Q_m$ can be greatly delayed in this way, so the exhaust gas temperature becomes considerably high and therefore the temperature of the $SO_X$ trap catalyst 11 can be quickly raised.

Further, to raise the temperature of the $SO_X$ trap catalyst 11, as shown by (IV) of FIG. 8, in addition to the main fuel $Q_m$, it is possible to inject auxiliary fuel $Q_p$ during the expansion stroke or exhaust stroke. That is, in this case, a large amount of the auxiliary fuel $Q_p$ is exhausted without burning in the form of unburned HC into the exhaust passage. This unburned HC is oxidized on the $SO_X$ trap catalyst 11 by the excess oxygen. Due to the heat of oxidation reaction at this time, the temperature of the $SO_X$ trap catalyst 11 is raised.

On the other hand, in the internal combustion engine shown in FIG. 2, it is also possible to have the hydrocarbon feed valve 14 supply a hydrocarbon and use the heat of oxidation reaction of the hydrocarbon to raise the temperature of the $SO_X$ trap catalyst 11. Further, it is also possible to control the injection by any of the modes shown in (II) to (IV) of FIG. 8 and supply hydrocarbon from the hydrocarbon feed valve 14. Note that whatever the method used to raise the temperature, the air-fuel ratio of the exhaust gas flowing into the $SO_X$ trap catalyst 11 is maintained lean without being made rich.

Next, the method of estimation of the $SO_X$ trap rate TRAP will be explained while referring to FIG. 9 to FIG. 12.

Figure 9:
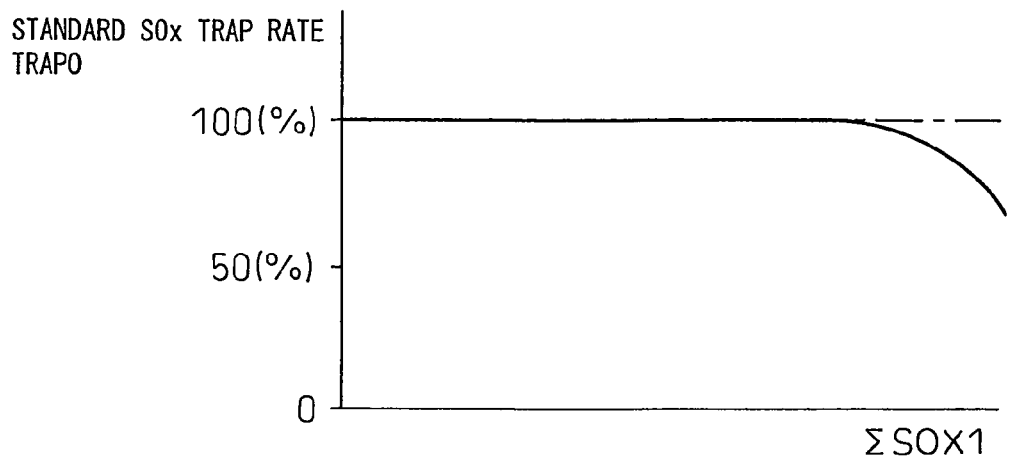
FIG. 9 is a view showing a standard $SO_X$ trap rate.
Figure 10:
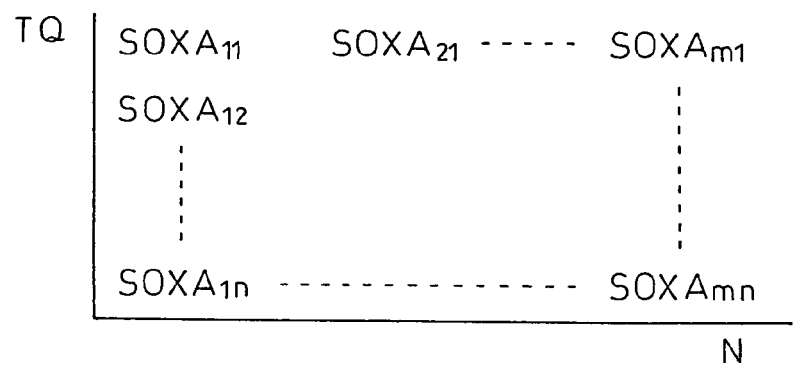
FIG. 10 is a view showing a map of $SO_X$ trap amounts SOXA and SOXB.
Figure 10:
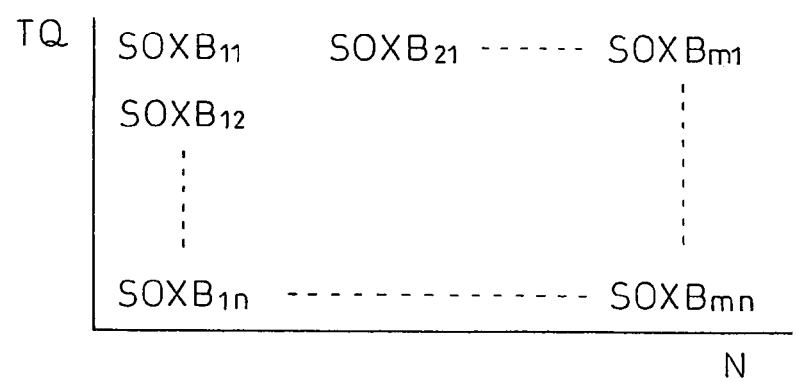
Figure 11:
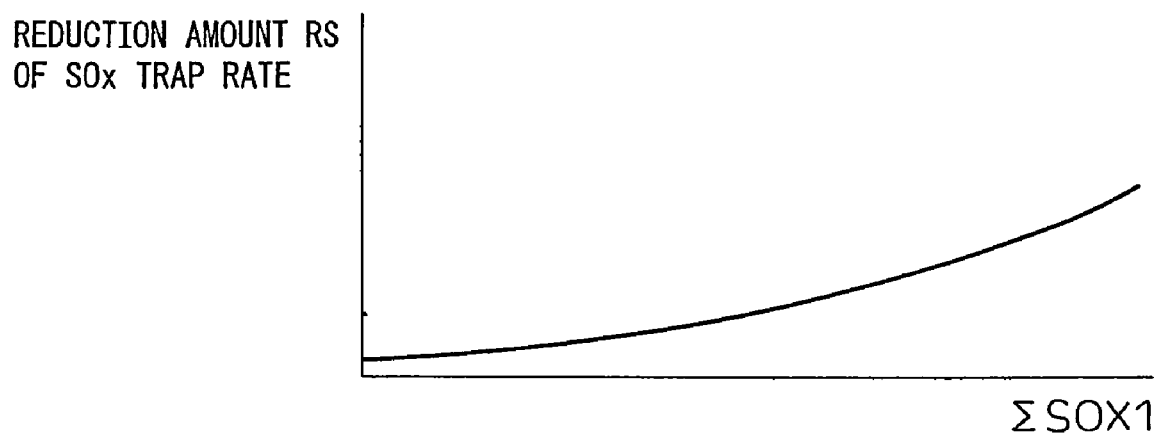
FIG. 11 is a view showing a reduction amount RS of the $SO_X$ trap rate etc.
Figure 11:
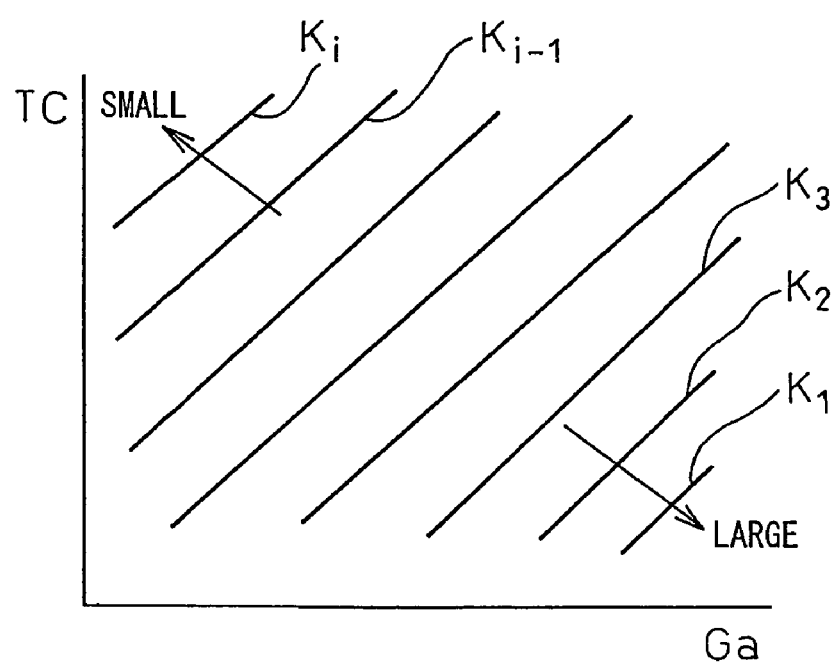
Figure 12:
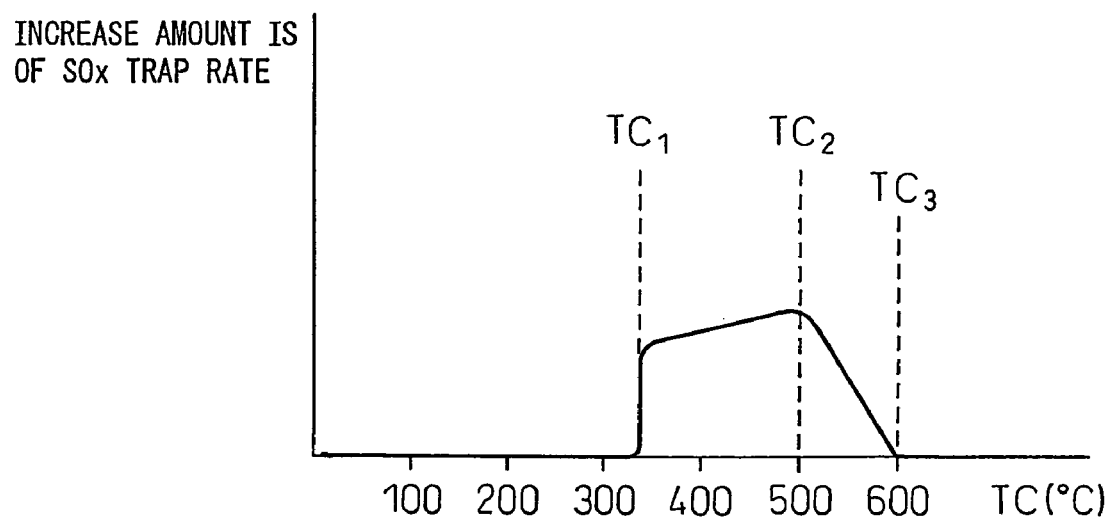
FIG. 12 is a view showing an increase amount IS of the $SO_X$ trap rate etc.
Figure 12:
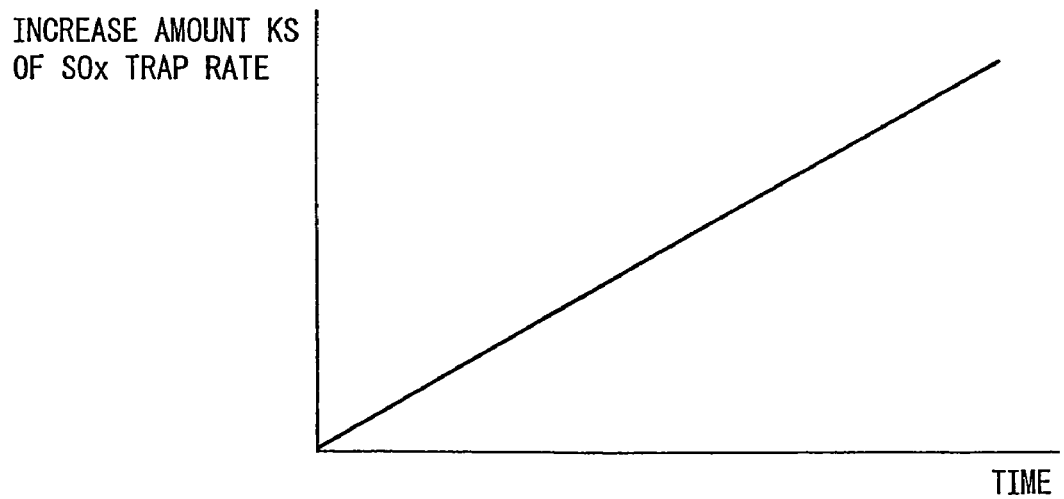

FIG. 9 shows the standard $SO_X$ trap rate TRAP0. This standard $SO_X$ trap rate TRAP0 shows the $SO_X$ trap rate which becomes standard when the restoration action of the $SO_X$ trap rate TRAP due to the nitrate movement and coagulation action is completed. This standard $SO_X$ trap rate TRAP0 is maintained at about 100 percent when the $SO_X$ trap amount $\Sigma SOX1$ trapped by the $SO_X$ trap catalyst 11 becomes a certain value or less. That is, when the $SO_X$ trap amount $\Sigma SOX1$ becomes a certain value or less, if the restoration action of the $SO_X$ trap rate due to the nitrate movement and coagulation action is completed, the $SO_X$ trap rate TRAP is restored to about 100 percent.

However, when the $SO_X$ trap amount $\Sigma SOX1$ becomes the certain value or more, even if the restoration action of the $SO_X$ trap rate due to the nitrate movement and coagulation action is performed, the $SO_X$ trap rate TRAP will no longer be restored to 100 percent. The more the $SO_X$ trap amount $\Sigma SOX1$ increases, the more the degree of restoration of the $SO_X$ trap rate TRAP falls. Therefore, as shown in FIG. 9, the standard $SO_X$ trap rate TRAP0 rapidly falls if the $SO_X$ trap amount $\Sigma SOX1$ becomes a certain value or more.

The $SO_X$ trap amount $\Sigma SOX1$ shown in FIG. 9 is calculated from the maps shown in FIGS. 10(A) and (B). That is, fuel contains sulfur in a certain ratio. Therefore, the $SO_X$ amount contained in the exhaust gas, that is, the $SO_X$ amount trapped by the $SO_X$ trap catalyst 11, is proportional to the fuel injection amount. The fuel injection amount is a function of the required torque and engine speed, therefore the $SO_X$ amount trapped by the $SO_X$ trap catalyst 11 also becomes a function of the required torque and engine speed. In the embodiment according to the present invention, the $SO_X$ trap amount SOXA trapped in the $SO_X$ trap catalyst 11 per unit time is stored as a function of the required torque TQ and engine speed N in the form of a map as shown in FIG. 10(A) in advance in the ROM 32.

Further, the lubrication oil also contains sulfur in a certain ratio. The amount of lubrication oil burned in the combustion chambers 2, that is, the $SO_X$ amount trapped contained in the exhaust gas and trapped in the $SO_X$ trap catalyst 11, also becomes a function of the required torque and engine speed. In the embodiment according to the present invention, the $SO_X$ amount SOXB contained in the lubrication oil and trapped in the $SO_X$ trap catalyst 11 per unit time is stored as a function of the required torque TQ and engine speed N in the form of a map as shown in FIG. 10(B) in advance in the ROM 32. By cumulatively adding the sum of the $SO_X$ trap amount SOXA and $SO_X$ trap amount SOXB, the $SO_X$ trap amount $\Sigma SOX1$ trapped in the $SO_X$ trap catalyst 11 is calculated.

On the other hand, FIG. 11(A) shows the reduction amount RS of the $SO_X$ trap rate TRAP becoming the standard per unit time. This reduction amount RS becomes larger the more the $SO_X$ trap amount $\Sigma SOX1$ increases. On the other hand, this reduction amount RS becomes larger the more the exhaust gas amount, that is, the intake air amount Ga, increases, and becomes lower the higher the temperature TC of the $SO_X$ trap catalyst 11 becomes. This relationship, that is, the correction coefficient K with respect to the reduction amount RS, is shown in FIG. 11(B). Note that this correction coefficient K becomes smaller in the order of $K_1, K_2, K_3 \ldots K_i$.

As opposed to this, FIGS. 12(A) and (B) show the increase amount IS and the rate of increase KS of the $SO_X$ trap rate TRAP per unit time when performing the nitrate movement and coagulation action.

Referring to FIG. 12(A), $TC_1$ shows the melting point of a nitrate of at least one of the alkali metal and alkali earth metal carried on the $SO_X$ trap catalyst 11, $TC_2$ shows the upper limit temperature at which the $SO_2$ can be oxidized well, and $TC_3$ shows about 600° C., that is, the regeneration temperature of the particulate filter 12. The higher the temperature TC of the $SO_X$ trap catalyst 11, the lower the viscosity of the melted nitrate, so between $TC_1$ and $TC_2$, the higher the temperature TC of the $SO_X$ trap catalyst 11, the larger the increase amount IS of the $SO_X$ trap rate TRAP.

On the other hand, between $TC_2$ and $TC_3$, the higher the temperature TC of the $SO_X$ trap catalyst 11, the weaker the oxidation action of the $SO_X$, so the higher the temperature TC of the $SO_X$ trap catalyst 11, the more the increase amount IS of the $SO_X$ trap rate TRAP falls. In the embodiment according to the present invention, when the nitrate movement and coagulation action should be performed, the temperature TC of the $SO_X$ trap catalyst 11 is held between the melting point $TC_1$ and the regeneration temperature $TC_3$ of the particulate filter 12. Preferably, it is held between the melting point $TC_1$ and the temperature $TC_2$ able to oxidize the $SO_2$ well.

On the other hand, the greater the time that elapses from when the nitrate becomes the melted state, the more the nitrate approaches the surface of the coat layer 51, so the higher the increase amount IS of the $SO_X$ trap rate per unit time. Therefore, as shown in FIG. 12(B), the longer the time from when the nitrate becomes a melted state, the higher the rate of increase KS of the $SO_X$ trap rate. By multiplying this rate of increase KS by the increase amount IS, the final increase amount of the $SO_X$ trap rate TRAP per unit time is found.

In this way, the reduction amount of the $SO_X$ trap rate TRAP per unit time is found by multiplying the correction coefficient K calculated from FIG. 11(B) with the standard reduction amount RS calculated from FIG. 11(A). Further, the increase amount of the $SO_X$ trap rate TRAP per unit time by the nitrate movement and coagulation action is found by multiplying the rate of increase KS calculated from the FIG. 12(B) with the increase amount IS calculated from the FIG. 12(A). On the other hand, the standard $SO_X$ trap rate TRAP0 is found from FIG. 9. Therefore, the reduction amount RS·K of the $SO_X$ trap rate TRAP per unit time can be subtracted from the standard $SO_X$ trap rate TRAP0 and the increase amount IS of the $SO_X$ trap rate·KS per unit time can be added to the standard $SO_X$ trap rate TRAP0 so as to find the $SO_X$ trap rate TRAP.

In one embodiment according to the present invention, it is judged if the thus calculated $SO_X$ trap rate TRAP has fallen to a predetermined $SO_X$ trap rate for the nitrate movement and coagulation action. When it has been judged that the $SO_X$ trap rate TRAP has fallen to the predetermined $SO_X$ trap rate for the nitrate movement and coagulation action, the temperature of the $SO_X$ trap catalyst 11 is raised to within the temperature region where the nitrate movement and coagulation action is promoted and held in this temperature region.

Further, referring to FIG. 9 and as already explained, when the $SO_X$ trap amount $\Sigma SOX1$ becomes a certain value or less, if the restoration action of the $SO_X$ trap rate due to the nitrate movement and coagulation action is completed, the $SO_X$ trap rate TRAP is restored to about 100 percent. However, if the $SO_X$ trap amount $\Sigma SOX1$ becomes a certain value or more, even if the restoration action of the $SO_X$ trap rate due to the nitrate movement and coagulation action is performed, the $SO_X$ trap rate TRAP will not be restored to 100 percent and, as shown in FIG. 9, the standard $SO_X$ trap rate TRAP0 rapidly falls.

That is, if the $SO_X$ trap amount $\Sigma SOX1$ becomes a certain value or more, the $SO_X$ concentration near the surface of the coat layer 51 becomes higher and as a result the $SO_X$ trap rate falls. However, if making the concentration of the $SO_X$ trap catalyst 11 rise to the about 600° C. $SO_X$ diffusion promotion temperature under a lean air-fuel ratio of the exhaust gas, the $SO_X$ concentrated near the surface of the coat layer 51 will diffuse toward the depths of the coat layer 51 so that the $SO_X$ concentration in the coat layer 51 becomes uniform. If the $SO_X$ present near the surface of the coat layer 51 diffuses toward the depths of the coat layer 51 in this way, the $SO_X$ concentration near the surface of the coat layer 51 will fall and therefore when the temperature raising control of the $SO_X$ trap catalyst 11 is completed, the $SO_X$ trap rate will be restored to about 100 percent.

Therefore, in the embodiment according to the present invention, even if the restoration action of the $SO_X$ trap rate due to the nitrate movement and coagulation action is performed, when the $SO_X$ trap rate is not longer restored to the target value, to restore the $SO_X$ trap rate, the temperature of the $SO_X$ trap catalyst is raised to the $SO_X$ diffusion promotion temperature under a lean air-fuel ratio of the exhaust gas.

Note that in this way, when raising the temperature of the $SO_X$ trap catalyst 11, if the air-fuel ratio of the exhaust gas is made rich, sometimes $SO_X$ will be released from the $SO_X$ trap catalyst 11. Therefore, when raising the temperature of the $SO_X$ trap catalyst 11, it is preferable to not make the air-fuel ratio of the exhaust gas rich. Further, if the $SO_X$ concentration near the surface of the coat layer 51 becomes higher, even if not raising the temperature of the $SO_X$ trap catalyst 11, if making the air-fuel ratio of the exhaust gas rich, sometimes $SO_X$ will end up being released from the $SO_X$ trap catalyst 11. Therefore, in the embodiment according to the present invention, when the temperature of the $SO_X$ trap catalyst 11 is the $SO_X$ release temperature or more, the air-fuel ratio of the exhaust gas flowing into the $SO_X$ trap catalyst 11 is not made rich.

In the present invention, basically consider use of the $SO_X$ trap catalyst 11 as is without replacement from the purchase of the vehicle to its scrapping. In recent years, in particular, the amount of sulfur contained in fuel has been reduced, therefore if making the volume of the $SO_X$ trap catalyst 11 large to a certain extent, it is possible to use the $SO_X$ trap catalyst 11 without replacement until scrapping the vehicle. For example, if assuming the durable running distance of a vehicle to be 500,000 km, the volume of the $SO_X$ trap catalyst 11 is made a volume enabling $SO_X$ to continue being trapped by a high $SO_X$ trap rate without temperature raising control for diffusion of $SO_X$ inside the coat layer 41 until a running distance of about 250,000 km. In this case, the initial temperature raising control for diffusion of $SO_X$ is performed until a running distance of about 250,000 km.

Figure 13:
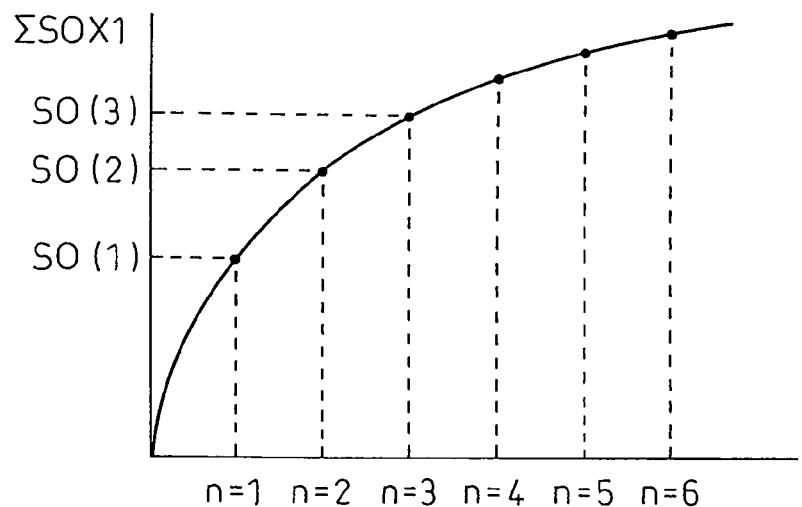
FIG. 13 is a view showing the relationship between the $SO_X$ trap amount $\Sigma SOX1$ and the stored $SO_X$ amount $SO(n)$ for temperature raising control etc.

In the embodiment according to the present invention, as shown in FIG. 13, the relationship between the $SO_X$ trap amount $\Sigma SOX1$ and the predetermined $SO_X$ trap amount $SO(n)$ when the $SO_X$ trap catalyst 11 should be raised in temperature for diffusion of the $SO_X$ is stored in advance. When the $SO_X$ trap amount $\Sigma SOX1$ exceeds the predetermined $SO(n)$ (n=1, 2, 3, . . . ), the $SO_X$ trap catalyst 11 is raised in temperature for diffusion of $SO_X$. Note that in FIG. 13, n shows what number the temperature elevation processing is. As will be understood from FIG. 13, as the number of times n of temperature elevation for restoration of the $SO_X$ trap rate increases, the predetermined amount $SO(n)$ is increased. The ratio of increase of this predetermined amount $SO(n)$ is reduced more the greater the number of processings n. That is, the ratio of increase of $SO(3)$ with respect to $SO(2)$ is reduced more than the ratio of increase of the $SO(2)$ with respect to $SO(1)$.

Figure 14:
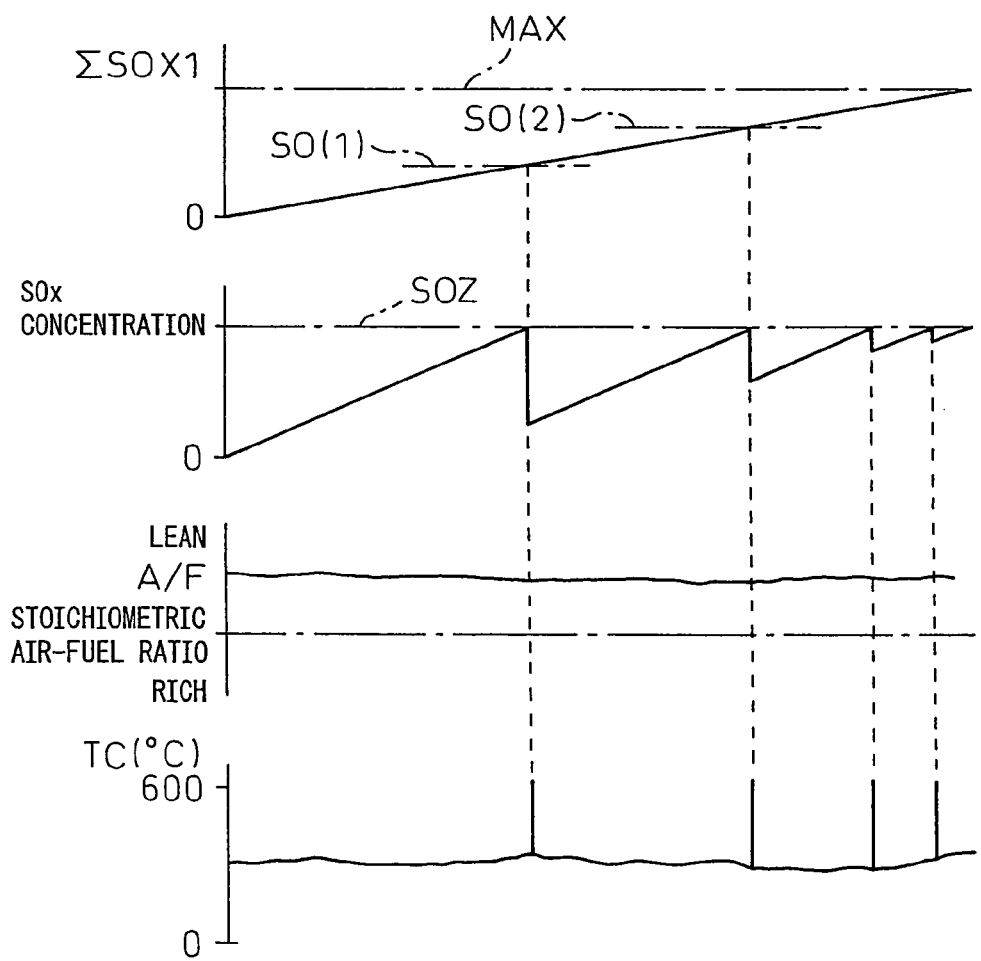
FIG. 14 is a time chart showing changes in the $SO_X$ trap amount $\Sigma SOX1$ etc.

That is, as shown in the time chart of FIG. 14, the $SO_X$ trap amount $\Sigma SOX1$ trapped in the $SO_X$ trap catalyst 11 continues to increase along with the elapse of time until the allowable value MAX. Note that in FIG. 14, the time when ΣSOX1=MAX is the time when the running distance becomes about 500,000 km or so.

On the other hand, in FIG. 14, the $SO_X$ concentration shows the $SO_X$ concentration near the surface of the $SO_X$ trap catalyst 11. As will be understood from FIG. 14, if the $SO_X$ concentration near the surface of the $SO_X$ trap catalyst 11 exceeds the allowable value SOZ, temperature raising control for making the temperature TC of the $SO_X$ trap catalyst 11 rise to the $SO_X$ diffusion promotion temperature under a lean air-fuel ratio of the exhaust gas A/F is performed. When the temperature raising control is performed, the $SO_X$ concentration near the surface of the $SO_X$ trap catalyst 11 falls, but the reduction amount of this $SO_X$ concentration becomes smaller each time the temperature raising control is performed, therefore the time from which one temperature raising control is performed to when the next temperature raising control is performed becomes shorter each time the temperature raising control is performed.

Note that as shown in FIG. 14, the fact of the $SO_X$ trap amount ΣSOX1 reaching SO(1), SO(2), . . . means that the $SO_X$ concentration near the surface of the $SO_X$ trap catalyst 11 has reached the allowable value SOZ.

Figure 15:
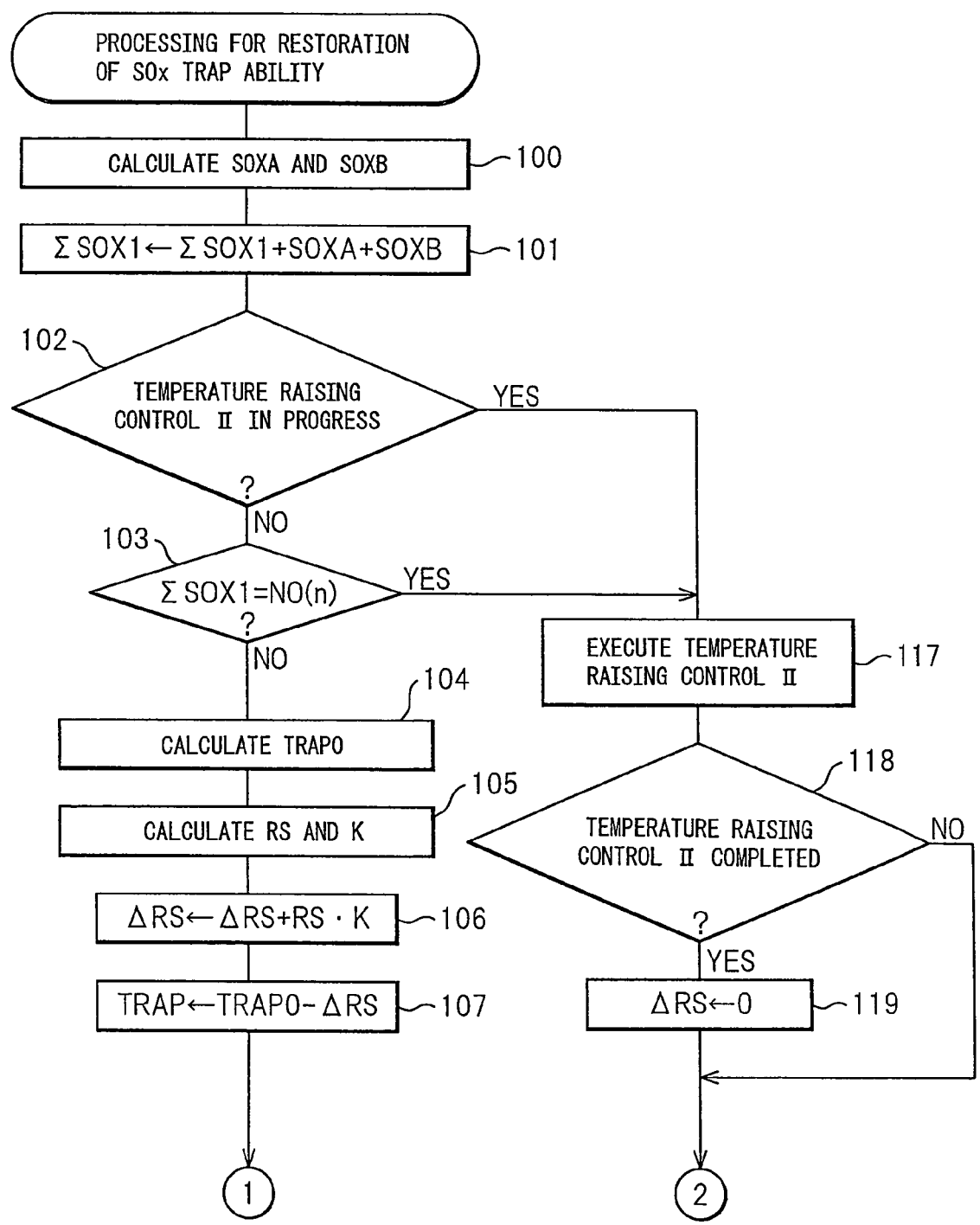
FIG. 15 is a flow chart for execution of a first embodiment of treatment for restoration of the $SO_X$ trap ability.
Figure 16:
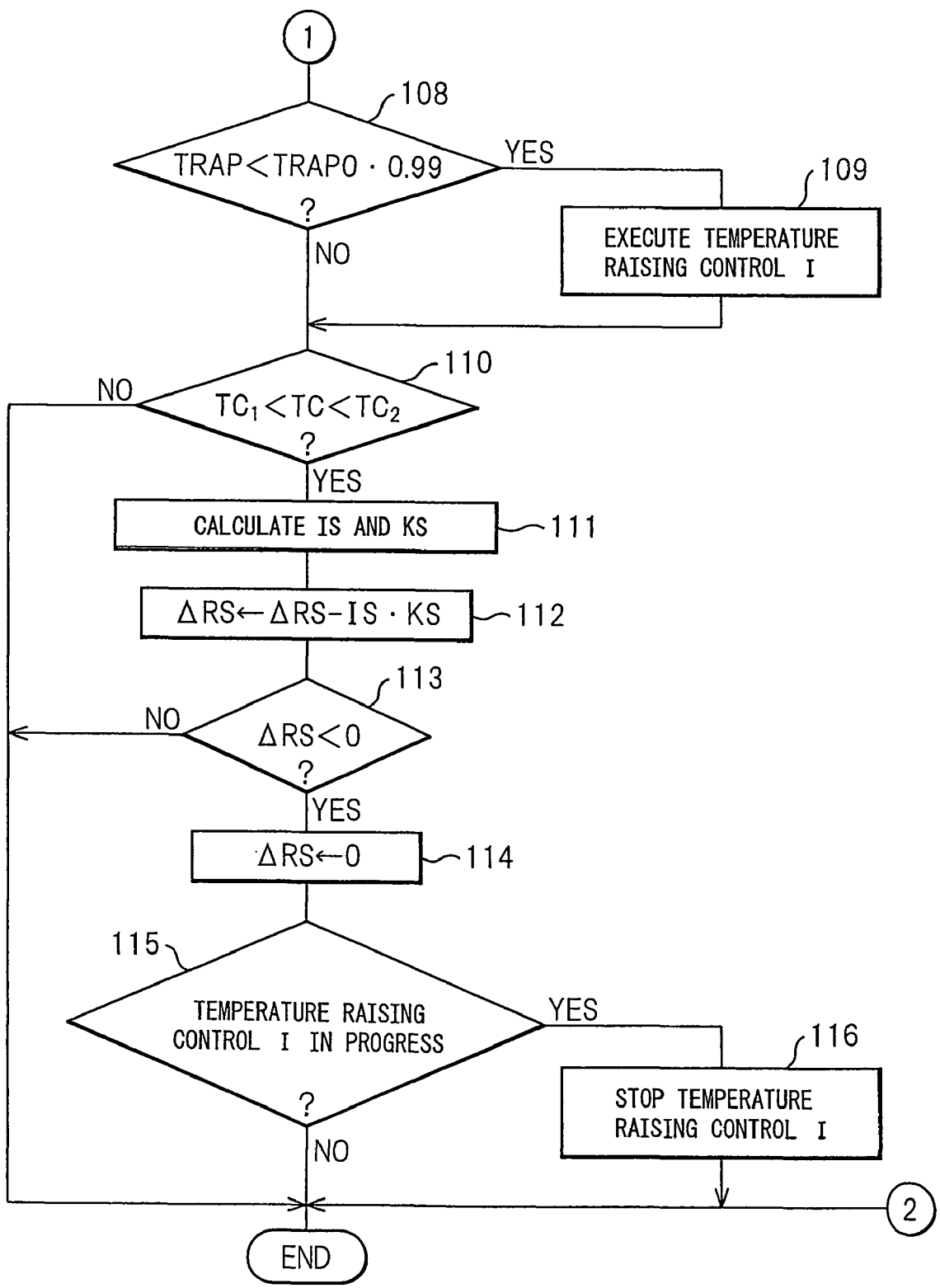
FIG. 16 is a flow chart for execution of a first embodiment of processing for restoration of the $SO_X$ trap ability.

FIG. 15 and FIG. 16 show the routine for execution of a first embodiment of treatment for restoration of the $SO_X$ trap ability. The routine is executed by interruption every predetermined time period.

Referring to FIG. 15 and FIG. 16, first, at step 100, the $SO_X$ trap amounts SOXA and SOMB trapped per unit time are read from FIG. 10(A), (B). At the next step 101, the sum of these SOXA and SOMB are added to the $SO_X$ trap amount ΣSOX1.

At the next step 102, it is judged whether the temperature control II for diffusion of $SO_X$ to the inside of the coat layer 51 is in progress. When the temperature control II is not in progress, the routine proceeds to step 103 where it is judged whether the $SO_X$ trap amount ΣSOX1 has reached the predetermined amount SO(n) (n=1, 2, 3, . . . ) shown in FIG. 13. When the $SO_X$ trap amount ΣSOX1 has not reached the predetermined amount SO(n), the routine proceeds to step 104.

At step 104, the standard $SO_X$ trap rate TRAP0 is calculated from the relationship shown in FIG. 9. At the next step 105, the reduction amount RS of the $SO_X$ trap rate TRAP per unit time is calculated from FIG. 11(A), while the correction coefficient K is calculated from FIG. 11(B). At the next step 106, the multiplied value RS·K of the reduction amount RS of the $SO_X$ trap rate and the correction coefficient K is added to the cumulative reduction amount ΔRS. At the next step 107, the cumulative reduction amount ΔRS is subtracted from the standard $SO_X$ trap rate TRAP0 so as to calculate the $SO_X$ trap rate TRAP.

At the next step 108, it is judged whether the $SO_X$ trap rate TRAP has fallen to the predetermined $SO_X$ trap rate TRAP0·0.99 for the nitrate movement and coagulation action. In this first embodiment, this predetermined $SO_X$ trap rate is made 99 percent of the standard $SO_X$ trap rate TRAP0. That is, at step 108, it is judged whether the $SO_X$ trap rate TRAP has fallen 1 percent from the standard $SO_X$ trap rate TRAP0. When it has been judged at step 108 that TRAP≧TRAP0·0.99, the routine proceeds to step 110. As opposed to this, when it has been judged that TRAP<TRAP0·0.99, the temperature raising control I for promoting the nitrate movement and coagulation action is performed. Next, the routine proceeds to step 110.

At step 110, it is judged whether the temperature TC of the $SO_X$ trap catalyst 11 is in the temperature range where the nitrate movement and coagulation action is promoted. This temperature region, as explained above, is $TC_1 < TC < TC_3$ and preferably, as described in step 110, is $TC_1 < TC < TC_2$. When the temperature TC of the $SO_X$ trap catalyst 11 is within the temperature range where the nitrate movement and coagulation action is promoted, the routine proceeds to step 111.

At step 111, the increase amount IS of the $SO_X$ trap rate TRAP per unit time is calculated from FIG. 12(A) and the rate of increase KS of the $SO_X$ trap rate TRAP is calculated from FIG. 12(B). At the next step 112, the multiplied value IS·KS of the increase amount IS of the $SO_X$ trap rate and the rate of increase KS is subtracted from the cumulative reduction amount ΔRS. At the next step 113, it is judged whether the cumulative reduction amount ΔRS has become negative, that is, whether the $SO_X$ trap rate TRAP has been restored to the standard $SO_X$ trap rate TRAP0. When ΔRS<0, the routine proceeds to step 114 where ΔRS is made zero. At the next step 115, it is judged whether the temperature raising control I is in progress. When the temperature raising control I is in progress, the routine proceeds to step 116 where the temperature raising control I is stopped.

On the other hand, when it has been judged at step 103 that the $SO_X$ trap amount ΣSOX1 has reached the predetermined amount SO(n), the routine proceeds to step 117 where temperature raising control II for diffusion of $SO_X$ is executed. During execution of the temperature raising control II, the routine proceeds from step 102 to step 117. At the next step 118, when it has been judged that the temperature raising control II has been completed, the routine proceeds to step 119 where the cumulative reduction amount ΔRS is made zero and the standard $SO_X$ trap rate TRAP0 is restored to 100 percent.

Figure 17:
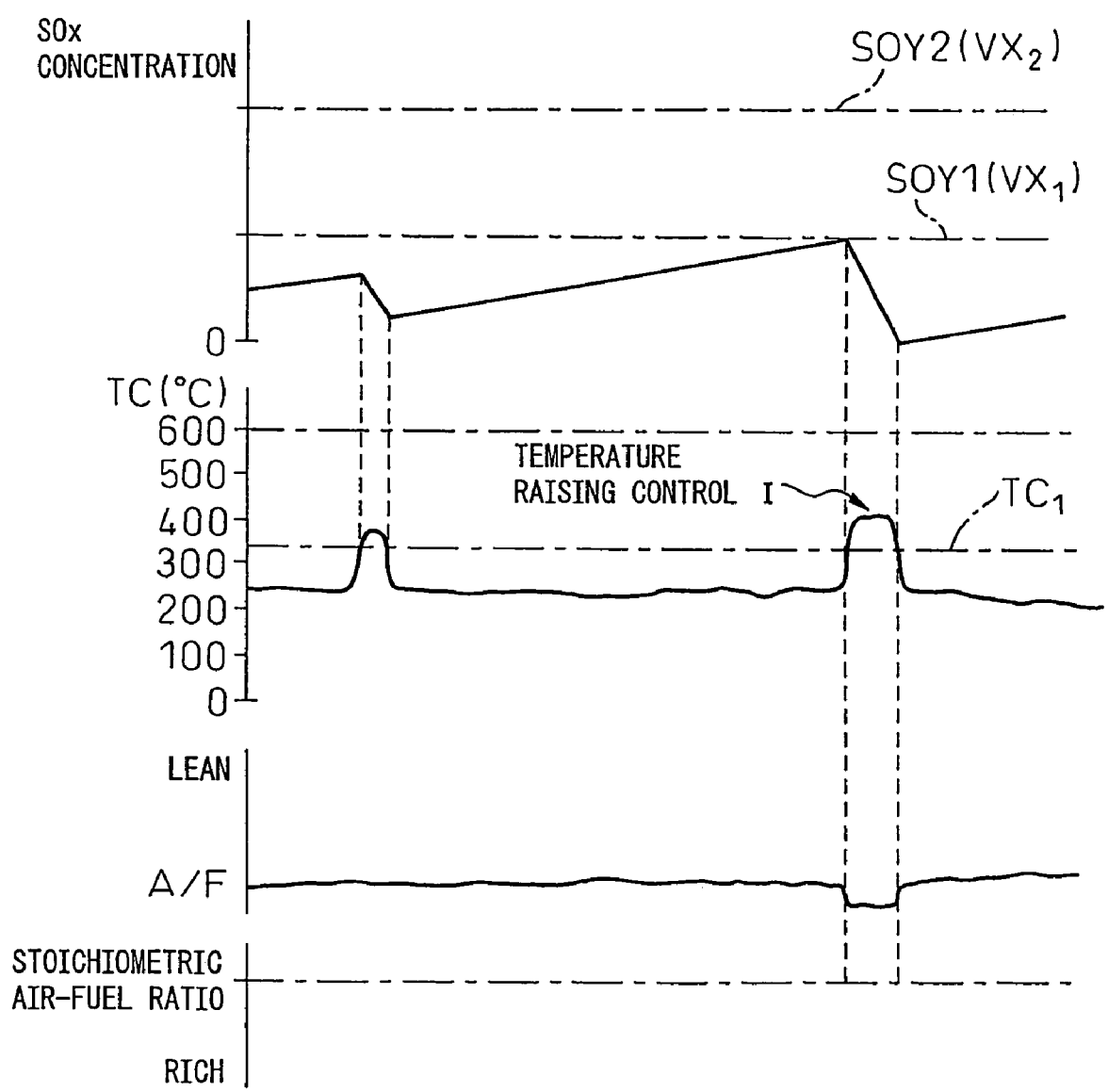
FIG. 17 is a time chart showing the processing for restoration of the $SO_X$ trap ability.
Figure 18:
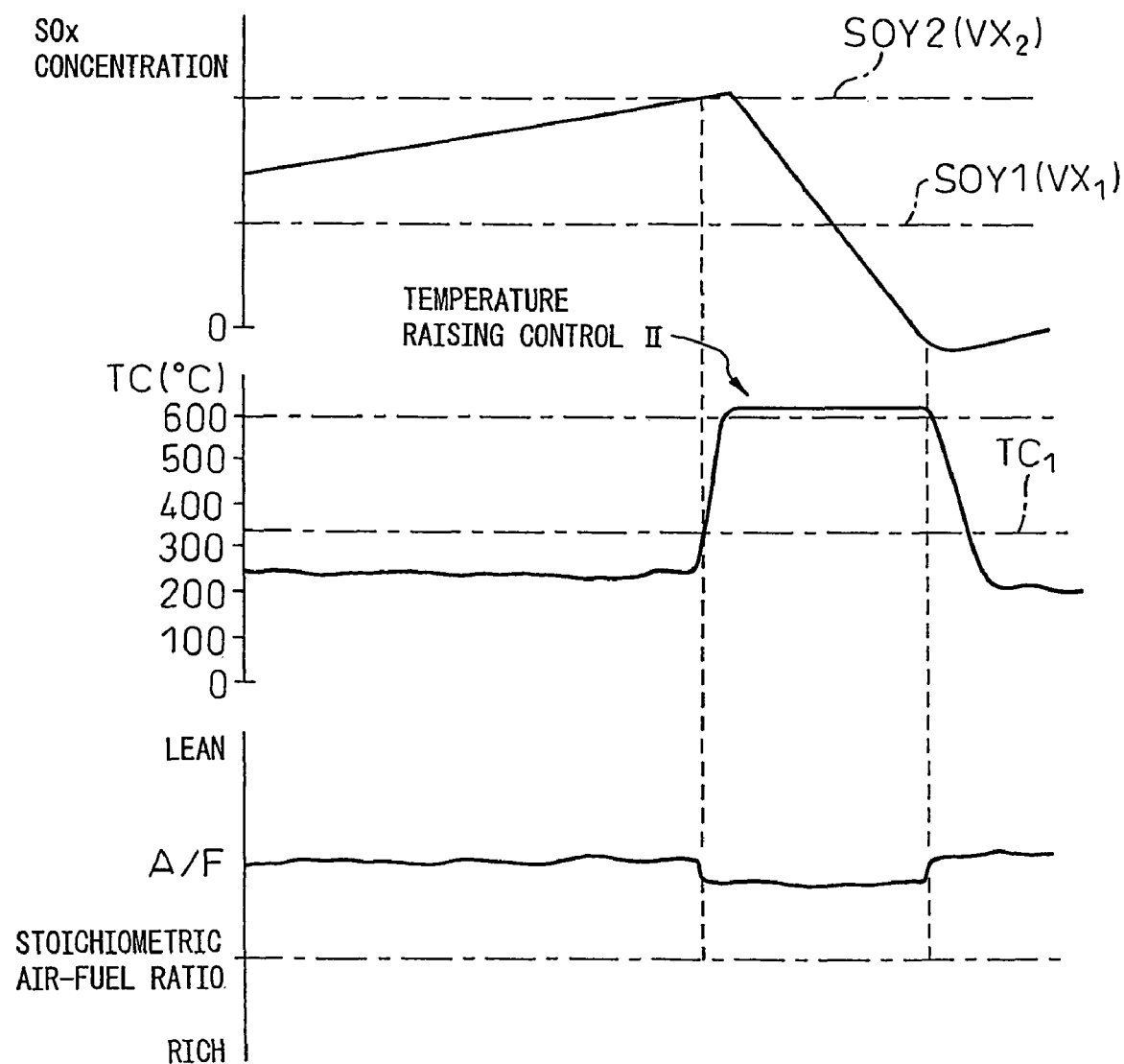
FIG. 18 is a time chart showing the processing for restoration of the $SO_X$ trap ability.
Figure 19:
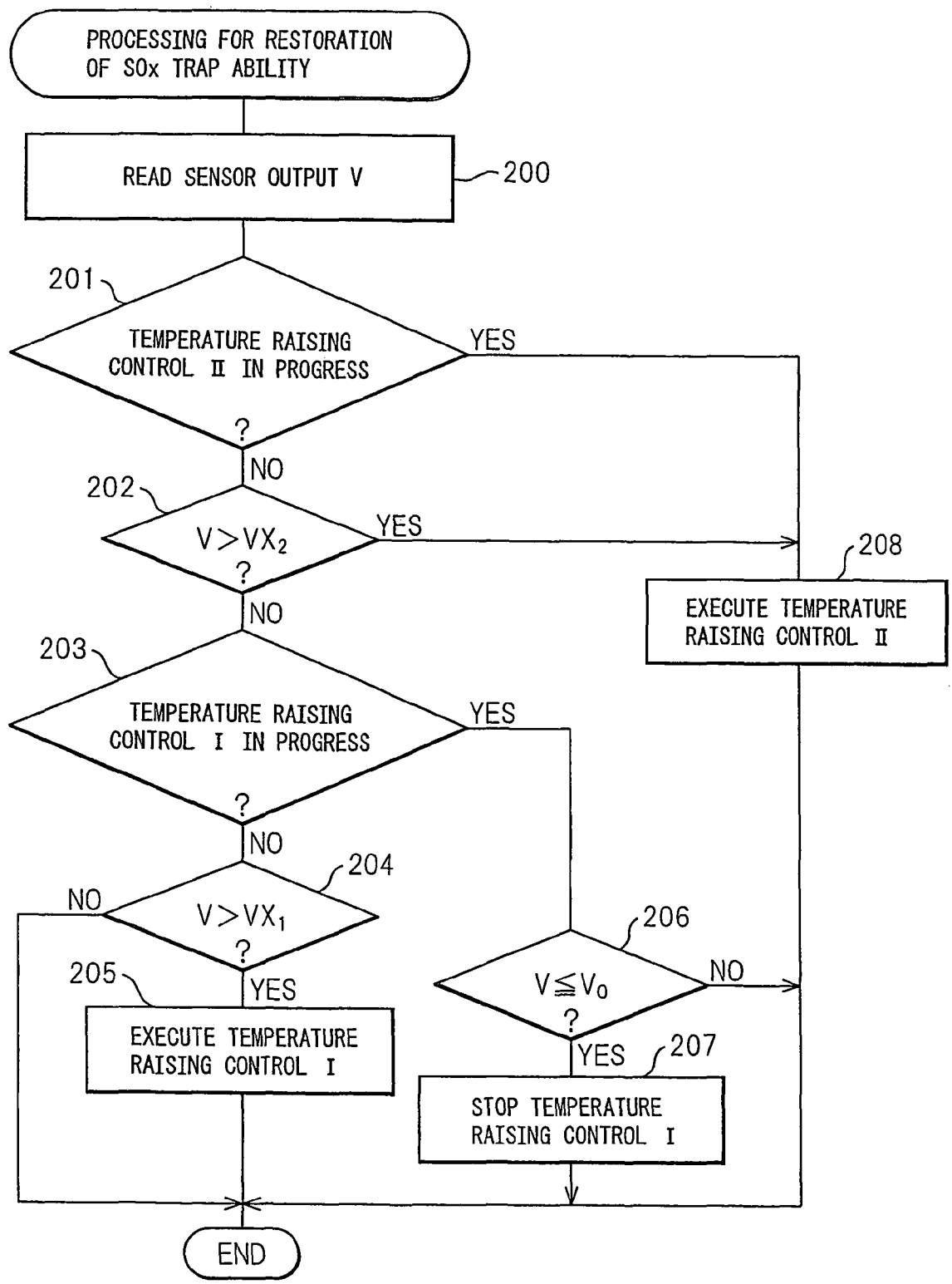
FIG. 19 is a flow chart for execution of a second embodiment of processing for restoration of the $SO_X$ trap ability.

FIG. 17 to FIG. 19 show a second embodiment for processing for restoration of the $SO_X$ trap ability. In this embodiment, as shown in FIG. 3, an $SO_X$ sensor 24 is arranged downstream of the $SO_X$ trap catalyst 11. This $SO_X$ sensor 24 detects the $SO_X$ concentration in the exhaust gas flowing out from the $SO_X$ trap catalyst 11. That is, in this second embodiment, as shown in FIG. 17, when the $SO_X$ concentration in the exhaust gas detected by the $SO_X$ sensor 24 exceeds the predetermined concentration SOY1 for the nitrate movement and coagulation action, temperature raising control I is performed for making the temperature of the $SO_X$ trap catalyst 11 rise to the temperature region where the nitrate movement and coagulation action is promoted.

Further, in this second embodiment, as shown in FIG. 18, when the $SO_X$ concentration in the exhaust gas detected by the $SO_X$ sensor 24 exceeds the predetermined concentration SOY2 to be promoted, to restore the $SO_X$ trap rate, temperature raising control II is performed for making the temperature of the $SO_X$ trap catalyst 11 rise to the $SO_X$ diffusion promotion temperature under a lean air-fuel ratio of the exhaust gas.

FIG. 19 shows the routine for processing for restoration of the $SO_X$ trap ability for executing this second embodiment.

Referring to FIG. 19, first, at step 200, the output signal of the $SO_X$ sensor 24, for example, the output voltage V, is read. At the next step 201, it is judged whether the temperature control II for diffusion of $SO_X$ in the coat layer 51 is in progress. When the temperature control II is not in progress, the routine proceeds to step 203 where it is judged whether the output voltage V of the $SO_X$ sensor 24 has exceeded the setting $VX_2$, that is, whether the $SO_X$ concentration in the exhaust gas has exceeded a predetermined concentration SOY2. When $V<VX_2$, that is, when the $SO_X$ concentration in the exhaust gas is not over the predetermined concentration SOY2, the routine proceeds to step 203.

At step 203, it is judged whether the temperature raising control I for promotion of the nitrate movement and coagulation action is in progress. When the temperature raising control I is not in progress, the routine proceeds to step 204 where it is judged whether the output voltage V of the $SO_X$ sensor 24 has exceeded the setting $VX_1$, that is, whether the $SO_X$ concentration in the exhaust gas has exceeded a predetermined concentration SOY1. When $V>VX_1(<VX_2)$, that is, when the $SO_X$ concentration in the exhaust gas exceeds a predetermined concentration SOY1 (<SOY2), the routine proceeds to step 205 where the temperature raising control I is executed. While the temperature raising control I is in progress, the routine proceeds from step 203 to step 206. At step 206, it is judged whether the output voltage V of the $SO_X$ sensor 24 has fallen below a predetermined restoration target value $V_0$, that is, whether the $SO_X$ trap rate of the $SO_X$ trap catalyst 11 has been restored. When $V \leq V_0$, that is, when the $SO_X$ trap rate is restored, the routine proceeds to step 209 where the temperature raising control I is stopped.

On the other hand, when it is judged at step 202 that $V>VX_2$, that is, the $SO_X$ concentration in the exhaust gas exceeds a predetermined concentration SOY2, the routine proceeds to step 208 where temperature raising control II for diffusion of $SO_X$ is executed. While the temperature raising control II is in progress, the routine proceeds from step 201 to step 208 where the temperature raising control II continues being executed.

Next, referring to FIG. 20 to FIG. 23, the processing for the $NO_X$ storage catalyst carried on the particulate filter 12 will be explained.

Figure 20:
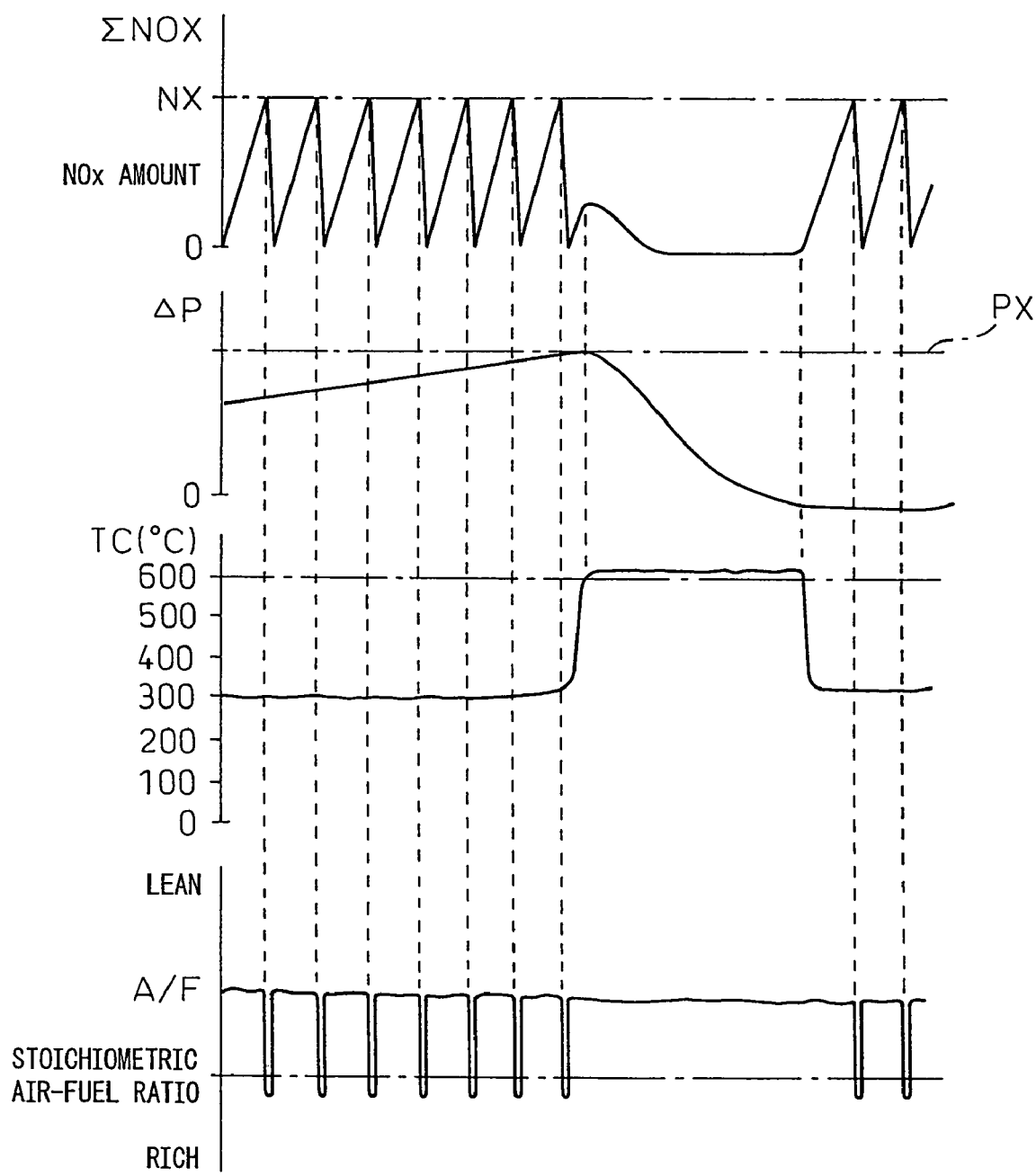
FIG. 20 is a time chart showing a temperature raising control of the particulate filter.

In the embodiment according to the present invention, the $NO_X$ amount NOXA stored in the $NO_X$ storage catalyst per unit time is stored as a function of the required torque TQ and engine speed N in the form of a map shown in FIG. 22(A) in advance in the ROM 32. By cumulatively adding this $NO_X$ amount NOXA, the $NO_X$ amount $\Sigma$NOX stored in the $NO_X$ storage catalyst is calculated. In the embodiment according to the present invention, as shown in FIG. 20, the air-fuel ratio of the exhaust gas A/F flowing into the particulate filter 12 is temporarily made rich each time this $NO_X$ amount $\Sigma$NOX reaches the allowable value NX and thereby the $NO_X$ storage catalyst releases the $NO_X$.

Note that when making the air-fuel ratio of the exhaust gas A/F flowing into the particulate filter 12 rich, it is preferable to maintain the air-fuel ratio of the exhaust gas flowing into the $SO_X$ trap catalyst 11 lean. Therefore, in the embodiment where the particulate filter 12 carries an $NO_X$ storage catalyst, as shown in FIG. 1 and FIG. 3, a hydrocarbon feed valve 14 is arranged in the exhaust passage between the $SO_X$ trap catalyst 11 and particulate filter 12. When the $NO_X$ storage catalyst should release $NO_X$, this hydrocarbon feed valve 14 supplies the exhaust passage with hydrocarbon so as to make the air-fuel ratio of the exhaust gas fed into the $NO_X$ storage catalyst temporarily rich.

On the other hand, the particulate contained in the exhaust gas, that is, the particulate substance, is trapped on the particulate filter 12 and successively oxidized. However, if the amount of the trapped particulate substance becomes greater than the amount of the oxidized particulate substance, the particulate substance gradually deposits on the particulate filter 12. In this case, if the amount of deposition of the particulate substance increases, a drop in the engine output ends up being invited. Therefore, when the amount of deposition of the particulate substance increases, the deposited particulate substance has to be removed. In this case, if making the temperature of the particulate filter 12 rise to about 600° C. under an excess of air, the deposited particulate substance is oxidized and removed.

Therefore, in the embodiment according to the present invention, when the amount of the particulate substance deposited on the particulate filter 12 exceeds the allowable amount, the temperature of the particulate filter 12 is raised and thereby the deposited particulate substance is removed by oxidation under a lean air-fuel ratio of the exhaust gas. Specifically speaking, in the embodiment according to the present invention, when the pressure difference $\Delta P$ before and after the particulate filter 12 detected by the pressure difference sensor 23 exceeds the allowable value PX as shown in FIG. 20, it is judged that the amount of the deposited particulate substance has exceeded the allowable amount. At this time, temperature raising control is performed for raising the temperature T of the particulate filter 12 while maintaining the air-fuel ratio of the exhaust gas flowing into the particulate filter 12 lean. Note that if the temperature T of the particulate filter 12 becomes higher, the trapped $NO_X$ amount $\Sigma$NOX is reduced due to the $NO_X$ storage catalyst releasing the $NO_X$.

Even when carrying an oxidation promotion catalyst on the particulate filter 12 or carrying an $NO_X$ storage catalyst, when regenerating the particulate filter 12, hydrocarbon is supplied from any of the hydrocarbon feed valves 14 shown from FIG. 1 to FIG. 3 in the state of maintaining the air-fuel ratio of the exhaust gas lean or the fuel is injected by any pattern of (II) to (IV) shown in FIG. 8. When the regeneration of the particulate filter 12 is started, the temperature of the particulate filter 12 becomes 600° C. or more, but at this time, the temperature of the $SO_X$ trap catalyst 11 is held at a temperature somewhat lower than 600° C., that is, the temperature region where the nitrate movement and coagulation action is promoted.

On the other hand, when the $SO_X$ trap rate by the $SO_X$ trap catalyst 11 is 100 percent, no $SO_X$ at all is sent into the $NO_X$ storage catalyst, therefore in this case, there is absolutely no risk of $SO_X$ being stored in the $NO_X$ storage catalyst. As opposed to this, when the $SO_X$ trap rate is not 100 percent, even if the $SO_X$ trap rate is close to 100 percent, $SO_X$ is stored in the $NO_X$ storage catalyst. However, in this case, the $SO_X$ amount stored in the $NO_X$ storage catalyst per unit time is extremely small. This being said, if a long time elapses, a large amount of $SO_X$ is stored in the $NO_X$ storage catalyst. If a large amount of $SO_X$ is stored, the stored $SO_X$ has to be released.

Figure 21:
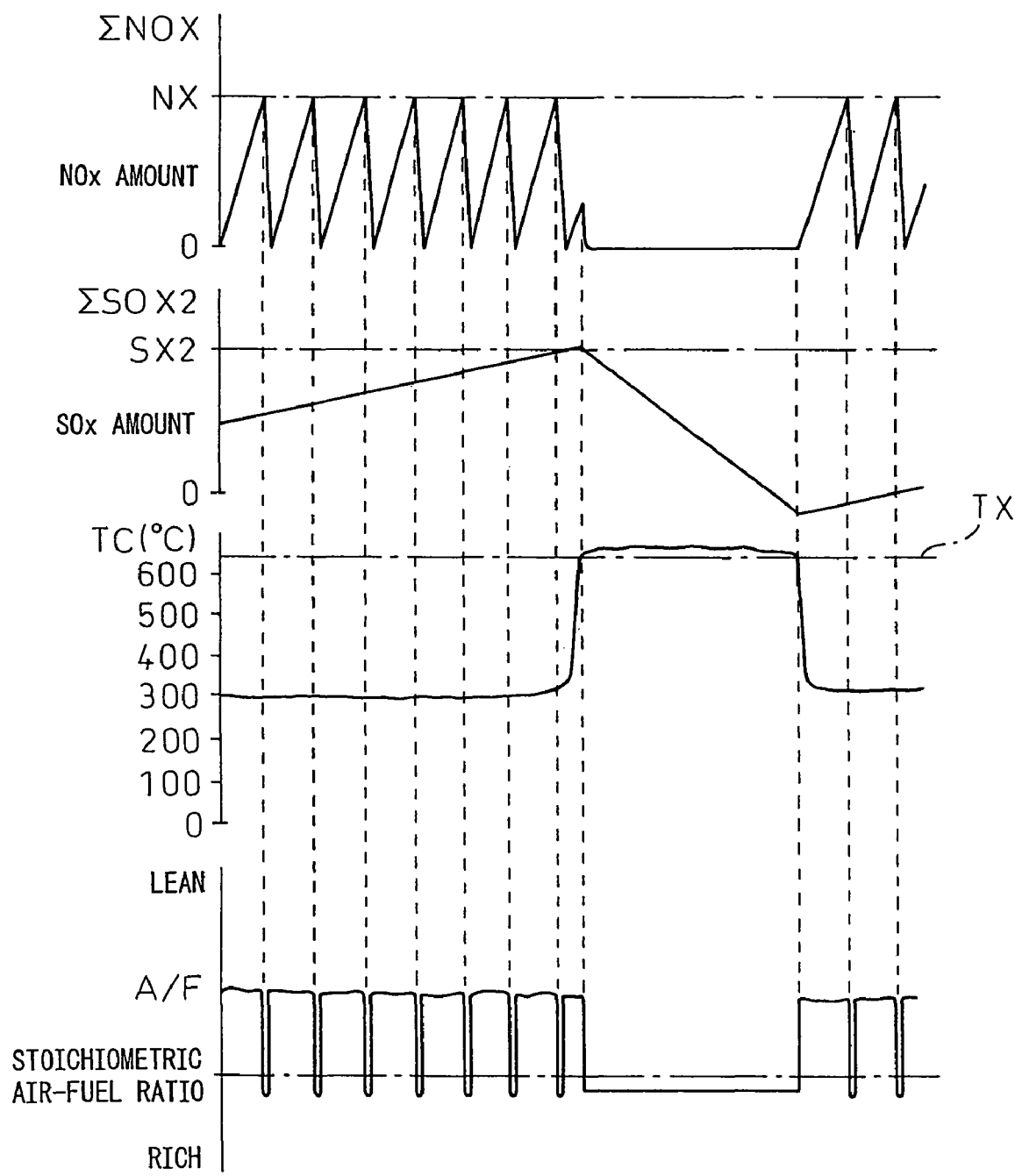
FIG. 21 is a time chart showing $SO_X$ release control.
Figure 22:
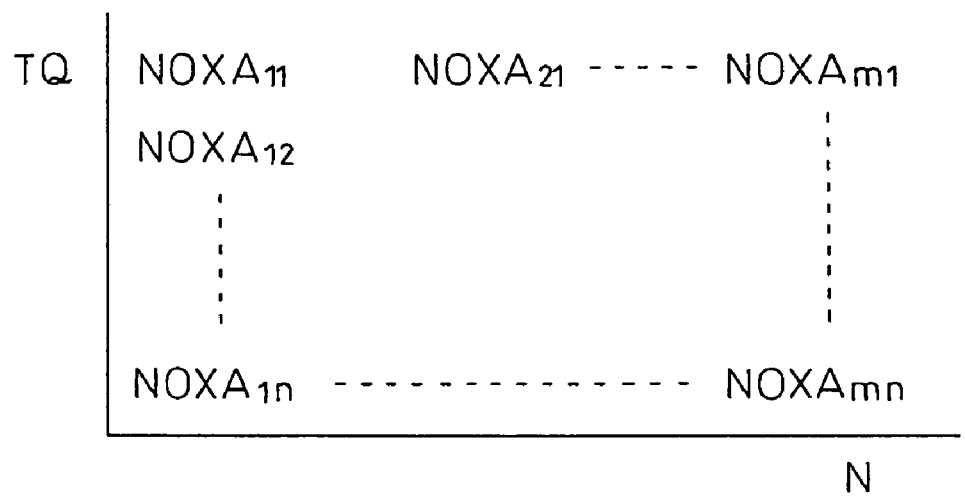
FIG. 22 is a view showing a map of the stored $NO_X$ amount NOXA etc.
Figure 22:
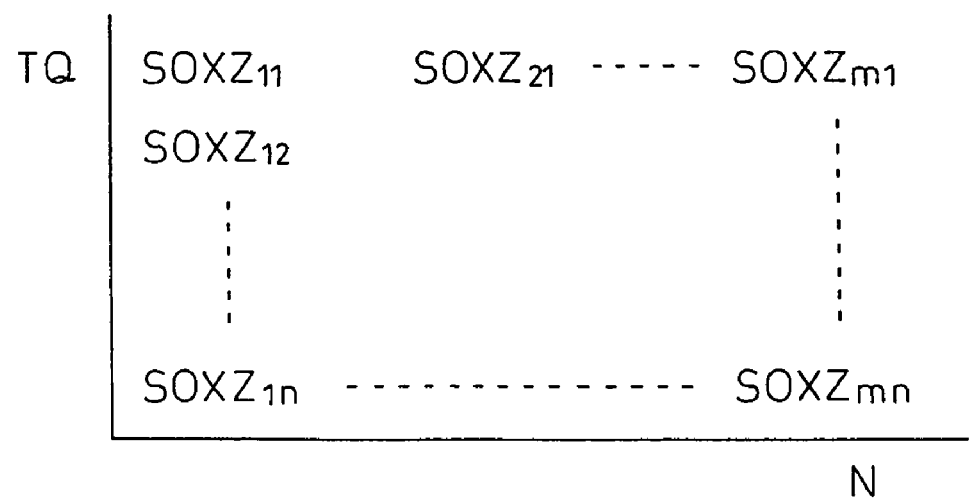

As explained above, to make the $NO_X$ storage catalyst release the $SO_X$, it is necessary to make the temperature of the $NO_X$ storage catalyst rise to the $SO_X$ release temperature and make the air-fuel ratio of the exhaust gas fed into the $NO_X$ storage catalyst rich. Therefore, in the embodiment according to the present invention, as shown in FIG. 21, when the $SO_X$ amount $\Sigma$SOX2 stored in the $NO_X$ storage catalyst reaches the allowable value SX2, the temperature TC of the $NO_X$ storage catalyst is raised to the $NO_X$ release temperature TX and the air-fuel ratio of the exhaust gas flowing into the $NO_X$ storage catalyst is made rich. Note that the $SO_X$ amount SOXZ stored in the $NO_X$ storage catalyst per unit time is stored as a function of the required torque TQ and engine speed N in the form of a map as shown in FIG. 22(B) in advance in the ROM 32. By cumulatively adding this $SO_X$ amount SOXZ, the stored $SO_X$ amount $\Sigma$SOX2 is calculated.

When making the $NO_X$ storage catalyst release $SO_X$, it is not preferable to make the air-fuel ratio of the exhaust gas flowing into the $SO_X$ trap catalyst 11 rich. Therefore, in the embodiment according to the present invention, when the $NO_X$ storage catalyst should release $SO_X$, first, as shown in FIG. 1 and FIG. 3, hydrocarbon is supplied from the hydrocarbon feed valve 14 downstream of the $SO_X$ trap catalyst 11 while maintaining the air-fuel ratio of the exhaust gas flowing into the $SO_X$ trap catalyst 11 lean so as to make the temperature TC of the $NO_X$ storage catalyst rise to the $SO_X$ release temperature TX, then increasing the amount of hydrocarbon supplied from the hydrocarbon feed valve 14 while maintaining the air-fuel ratio of the exhaust gas flowing into the $SO_X$ trap catalyst 11 lean so as to increase the amount of hydrocarbon supplied and make the air-fuel ratio of the exhaust gas sent into the $NO_X$ storage catalyst rich. Note that in this case, the air-fuel ratio of the exhaust gas fed into the $NO_X$ storage catalyst may be switched alternately between rich and lean.

Figure 23:
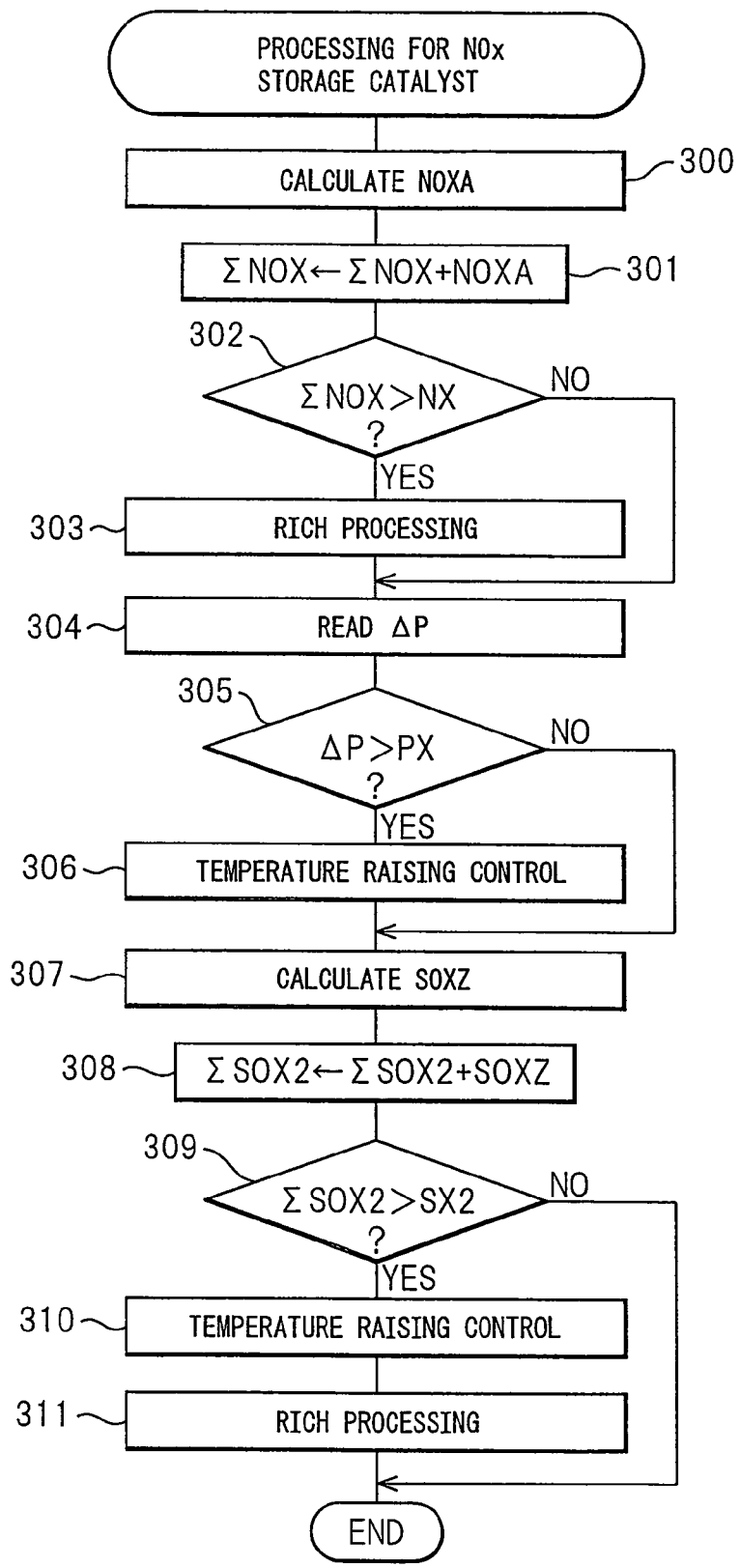
FIG. 23 is a flow chart for execution of processing on the $NO_X$ storage catalyst.

FIG. 23 shows the processing routine for the $NO_X$ storage catalyst.

Referring to FIG. 23, first, at step 300, the $NO_X$ amount NOXA stored per unit time is calculated from the map shown in FIG. 22(A). At the next step 301, this NOXA is added to the $NO_X$ amount ΣNOX stored in the $NO_X$ storage catalyst. At the next step 302, it is judged whether the stored $NO_X$ amount ΣNOX has exceeded the allowable value NX. When ΣNOX>NX, the routine proceeds to step 303 where rich processing is performed to temporarily switch the air-fuel ratio of the exhaust gas fed into the $NO_X$ storage catalyst from lean to rich and the ΣNOX is cleared.

At the next step 304, the pressure difference sensor 23 detects the pressure difference ΔP before and after the particulate filter 12. At the next step 305, it is judged whether the pressure difference ΔP has exceeded the allowable value PX. When ΔP>PX, the routine proceeds to step 306 where the temperature raising control of the particulate filter 12 is performed. This temperature raising control is performed by supplying hydrocarbon from the hydrocarbon feed valve 14 while maintaining the air-fuel ratio of the exhaust gas flowing into the particulate filter 12 lean.

At the next step 307, the $SO_X$ amount SOXZ stored per unit time is calculated from the map shown in FIG. 22(B). At the next step 308, this SOXZ is added to the $SO_X$ amount ΣSOX2 stored in the $NO_X$ storage catalyst. At the next step 309, it is judged whether the stored $SO_X$ amount ΣSOX2 has exceeded the allowable value SX2. When ΣSOX2>SX2, the routine proceeds to step 310 where temperature raising control is performed to make the temperature TC of the $NO_X$ storage catalyst rise to the $SO_X$ release temperature TX. At the next step 111, rich processing is performed to make the air-fuel ratio of the exhaust gas sent into the $NO_X$ storage catalyst rich and ΣSOX2 is cleared.

When the particulate filter 12 does not carry an $NO_X$ storage catalyst and carries only an oxidation promotion catalyst, it is sufficient to perform only the processing for regeneration of the particulate filter 12, so in the routine shown in FIG. 23, only step 304 to step 306 is executed. In this case, as shown in FIG. 2, by supplying hydrocarbon from the hydrocarbon feed valve 14 arranged upstream of the $SO_X$ trap catalyst 11, the temperature raising action of the particulate filter 12 can be performed.

The invention claimed is:

1. An exhaust purification device of an internal combustion engine arranging an $SO_X$ trap catalyst able to trap $SO_X$ contained in exhaust gas inside an engine exhaust passage, wherein
the $SO_X$ trap catalyst carries at least one of an alkali metal and alkali earth metal diffused inside it,
a temperature of the $SO_X$ trap catalyst is held at a temperature where a nitrate of the at least one of alkali metal and alkali earth metal becomes a melted state during engine operation, whereby a nitrate movement and coagulation action where the nitrate in the $SO_X$ trap catalyst moves to and coagulates at the $SO_X$ trap catalyst surface is promoted, and the nitrate movement and coagulation action is used to restore a $SO_X$ trap rate and remove the $SO_X$,
the $SO_X$ trap catalyst has a property of trapping $SO_X$ contained in exhaust gas when an air-fuel ratio of the exhaust gas flowing into the $SO_X$ trap catalyst is lean and causing the trapped $SO_X$ to gradually diffuse inside the $SO_X$ trap when making the temperature of the $SO_X$ trap catalyst rise to a $SO_X$ diffusion promotion temperature under a lean air-fuel ratio of the exhaust gas, and
when the $SO_X$ trap rate is no longer restored to the target value even when the restoration action of the $SO_X$ trap rate due to the nitrate movement and coagulation action is performed, to restore the $SO_X$ trap rate, the temperature of the $SO_X$ trap catalyst is made to rise to the $SO_X$ diffusion promotion temperature under a lean air-fuel ratio of the exhaust gas.

2. An exhaust purification device of an internal combustion engine as set forth in claim 1, wherein estimating means for estimating an $SO_X$ trap rate is provided and, when the estimated $SO_X$ trap rate has fallen to a predetermined $SO_X$ trap rate for promotion of diffusion of $SO_X$, the temperature of the $SO_X$ trap catalyst is made to rise to the $SO_X$ diffusion promotion temperature under a lean air-fuel ratio of the exhaust gas to restore the $SO_X$ trap rate.

3. An exhaust purification device of an internal combustion engine as set forth in claim 1, wherein an $SO_X$ sensor able to detect a $SO_X$ concentration in the exhaust gas is arranged in the exhaust passage downstream of the $SO_X$ trap catalyst and, when the $SO_X$ concentration in the exhaust gas detected by the $SO_X$ sensor exceeds a predetermined concentration for promotion of diffusion of $SO_X$, the temperature of the $SO_X$ trap catalyst is made to rise to the $SO_X$ diffusion promotion temperature under a lean air-fuel ratio of the exhaust gas to restore the $SO_X$ trap rate.

4. An exhaust purification device of an internal combustion engine as set forth in claim 1, wherein an $NO_X$ storage catalyst storing $NO_X$ contained in the exhaust gas when the air-fuel ratio of the inflowing exhaust gas is lean and releasing the stored $NO_X$ when the air-fuel ratio of the inflowing exhaust gas becomes the stoichiometric air-fuel ratio or rich is arranged in the exhaust passage downstream of the $SO_X$ trap catalyst, a hydrocarbon feed device is arranged in the exhaust passage between the $SO_X$ trap catalyst and the $NO_X$ storage catalyst, and, when the $NO_X$ storage catalyst should release the $NO_X$, the hydrocarbon feed device supplies hydrocarbon in the exhaust passage to make the air-fuel ratio of the exhaust gas flowing into the $NO_X$ storage catalyst temporarily rich.

5. An exhaust purification device of an internal combustion engine as set forth in claim 1, wherein the $SO_X$ trap catalyst is comprised of a coat layer formed on a base material and a precious metal catalyst carried on the coat layer and the coat layer contains at least one of an alkali metal and alkali earth metal diffused in it.

6. An exhaust purification device of an internal combustion engine as set forth in claim 1, wherein there is a temperature region of the $SO_X$ trap catalyst where the nitrate movement and coagulation action is promoted and the temperature of the $SO_X$ trap catalyst is occasionally held in the temperature region where the nitrate movement and coagulation action is promoted during engine operation so as to occasionally restore the $SO_X$ trap rate.

7. An exhaust purification device of an internal combustion engine as set forth in claim 6, wherein a lower limit temperature of the temperature region is a melting point of a nitrate of the at least one of the alkali metal and alkali earth metal and an upper limit of the temperature region is the upper limit temperature where $SO_X$ can be oxidized on the $SO_2$ trap catalyst.

8. An exhaust purification device of an internal combustion engine as set forth in claim 6, wherein judging means for judging if the $SO_X$ trap rate has fallen to a predetermined $SO_X$ trap rate for the nitrate movement and coagulation action is provided and, when it has been judged that the $SO_X$ trap rate has fallen to the predetermined $SO_X$ trap rate for the nitrate movement and coagulation action, the temperature of the $SO_X$ trap catalyst is raised to within the temperature region where the nitrate movement and coagulation action is promoted and held in the temperature region.

9. An exhaust purification device of an internal combustion engine as set forth in claim 8, wherein estimating means for estimating the $SO_X$ trap rate is provided and, when the estimated $SO_X$ trap rate has fallen to the predetermined $SO_X$ trap rate for the nitrate movement and coagulation action, the temperature of the $SO_X$ trap catalyst is raised to within the temperature region where the nitrate movement and coagulation action is promoted and held in the temperature region.

10. An exhaust purification device of an internal combustion engine as set forth in claim 8, wherein an $SO_X$ sensor able to detect a $SO_X$ concentration in the exhaust gas is arranged in the exhaust passage downstream of the $SO_X$ trap catalyst and, when the $SO_X$ concentration in the exhaust gas detected by the $SO_X$ sensor exceeds the predetermined concentration for the nitrate movement and coagulation action, the temperature of the $SO_X$ trap catalyst is raised to within the temperature region where the nitrate movement and coagulation action is promoted and held in the temperature region.

11. An exhaust purification device of an internal combustion engine as set forth in claim 6, wherein a particulate filter is arranged downstream of the $SO_X$ trap catalyst, a lower limit temperature of the temperature region is a melting point of a nitrate of the at least one of the alkali metal and alkali earth metal, and an upper limit temperature of the temperature region is a regeneration temperature of the particulate filter.

12. An exhaust purification device of an internal combustion engine as set forth in claim 11, wherein at the time of regeneration of the particulate filter, the temperature of the $SO_X$ trap catalyst is held in the temperature region.

13. An exhaust purification method for removing $SO_X$ contained in exhaust gas by an $SO_X$ trap catalyst arranged in an engine exhaust passage, the method comprising:
carrying at least one of an alkali metal and alkali earth metal diffused in the $SO_X$ trap catalyst,
holding a temperature of the $SO_X$ trap catalyst at a temperature where a nitrate of at least one of the alkali metal and alkali earth metal becomes a melted state during engine operation so as to promote a nitrate movement and coagulation action where the nitrate in the $SO_X$ trap catalyst moves to and coagulates at the $SO_X$ trap catalyst surface, and
using the nitrate movement and coagulation action to restore a $SO_X$ trap rate and remove, the $SO_X$, wherein
the $SO_X$ trap catalyst has a property of trapping $SO_X$ contained in exhaust gas when an air-fuel ratio of the exhaust gas flowing into the $SO_X$ trap catalyst is lean and causing the trapped $SO_X$ gradually diffuse inside the $SO_X$ trap catalyst when making the temperature of the $SO_X$ trap catalyst rise to a $SO_X$ diffusion promotion temperature under a lean air-fuel ratio of the exhaust gas, and
when the $SO_X$ trap rate is no longer restored to the target value even when the restoration action of the $SO_X$ trap rate due to the nitrate movement and coagulation action is performed, to restore the $SO_X$ trap rate, the temperature of the $SO_X$ trap catalyst is made to rise to the $SO_X$ diffusion promotion temperature under a lean air-fuel ratio of the exhaust gas.

14. An exhaust purification method as set forth claim 13, wherein there is a temperature region of the $SO_X$ trap catalyst where the nitrate movement and coagulation action is promoted and the temperature of the $SO_X$ trap catalyst is occasionally held in the temperature region where the nitrate movement and coagulation action is promoted during engine operation so as to occasionally restore the $SO_X$ trap rate.

15. An exhaust purification method as set forth claim 14, wherein a lower limit temperature of the temperature region is a melting point of a nitrate of the at least one of the alkali metal and alkali earth metal and an upper limit of the temperature region is the upper limit temperature where $SO_X$ can be oxidized on the $SO.sub.2$ trap catalyst.

16. An exhaust purification method as set forth claim 15, which estimates an $SO_X$ trap rate and, when the estimated $SO_X$ trap rate has fallen to a predetermined $SO_X$ trap rate for promotion of diffusion of $SO_X$, makes the temperature of the $SO_X$ trap catalyst rise to the $SO_X$ diffusion promotion temperature under a lean air-fuel ratio of the exhaust gas to restore the $SO_X$ trap rate.

17. An exhaust purification method as set forth claim 15, which, when a $SO_X$ concentration in the exhaust gas detected by an $SO_X$ sensor arranged in the exhaust passage downstream of the $SO_X$ trap catalyst exceeds a predetermined concentration for promotion of diffusion of $SO_X$, makes the temperature of the $SO_X$ trap catalyst rise to the $SO_X$ diffusion promotion temperature under a lean air-fuel ratio of the exhaust gas to restore the $SO_X$ trap rate.

18. An exhaust purification method as set forth claim 14, which judges if the $SO_X$ trap rate has fallen to a predetermined $SO_X$ trap rate for the nitrate movement and coagulation action and, when it has been judged that the $SO_X$ trap rate has fallen to the predetermined $SO_X$ trap rate for the nitrate movement and coagulation action, makes the temperature of the $SO_X$ trap catalyst rise to within the temperature region where the nitrate movement and coagulation action is promoted and holds it in the temperature region.

19. An exhaust purification method as set forth claim 18, which estimates the $SO_X$ trap rate and, when the estimated $SO_X$ trap rate has fallen to the predetermined $SO_X$ trap rate for the nitrate movement and coagulation action, makes the temperature of the $SO_X$ trap catalyst rise to within the temperature region where the nitrate movement and coagulation action is promoted and holds it in the temperature region.

20. An exhaust purification method as set forth claim 18, which, when an $SO_X$ concentration in the exhaust gas detected by an $SO_X$ sensor arranged in the exhaust passage downstream of the $SO_X$ trap catalyst exceeds the predetermined concentration for the nitrate movement and coagulation action, makes the temperature of the $SO_X$ trap catalyst rise to within the temperature region where the nitrate movement and coagulation action is promoted and holds it in the temperature region.

21. An exhaust purification method as set forth claim 20, wherein a lower limit temperature of the temperature region is a melting point of a nitrate of the at least one of the alkali metal and alkali earth metal, and an upper limit temperature of the temperature region is a regeneration temperature of a particulate filter arranged downstream of the $SO_X$ trap catalyst.

22. An exhaust purification method as set forth claim 21, wherein at the time of regeneration of the particulate filter, the temperature of the $SO_X$ trap catalyst is held in the temperature region.

\* \* \* \* \*